United States Patent
Moore et al.

(10) Patent No.: US 10,826,163 B2
(45) Date of Patent: Nov. 3, 2020

(54) ANTENNA DESIGNS FOR WEARABLE HEADS-UP DISPLAYS

(71) Applicant: GOOGLE LLC, Mountain View, CA (US)

(72) Inventors: Joshua Moore, Elora (CA); Kai Zhang, Waterloo (CA); George Shaker, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 128 days.

(21) Appl. No.: 16/231,279

(22) Filed: Dec. 21, 2018

(65) Prior Publication Data

US 2019/0198982 A1 Jun. 27, 2019

Related U.S. Application Data

(60) Provisional application No. 62/609,607, filed on Dec. 22, 2017, provisional application No. 62/670,200, filed on May 11, 2018.

(51) Int. Cl.

| | |
|---|---|
| *H01Q 1/27* | (2006.01) |
| *H01Q 9/42* | (2006.01) |
| *G02C 5/14* | (2006.01) |
| *G02C 11/00* | (2006.01) |
| *G02B 27/01* | (2006.01) |

(52) U.S. Cl.
CPC ......... *H01Q 1/273* (2013.01); *G02B 27/0176* (2013.01); *G02C 5/14* (2013.01); *G02C 11/10* (2013.01); *H01Q 9/42* (2013.01); *G02B 2027/0178* (2013.01)

(58) Field of Classification Search
CPC . H01Q 1/27; H01Q 9/42; G02B 27/01; G02C 5/14; G02C 11/10
USPC .......................................................... 343/702
See application file for complete search history.

(56) References Cited

U.S. PATENT DOCUMENTS

| | | | |
|---|---|---|---|
| 2012/0206335 A1* | 8/2012 | Osterhout | G06F 3/017 345/156 |
| 2016/0078278 A1* | 3/2016 | Moore | G06K 9/00671 345/8 |

OTHER PUBLICATIONS

International Search Report and Written Opinion of the International Searching Authority, PCT/CA2019/050044, Jun. 10, 2019.

* cited by examiner

*Primary Examiner* — Andrea Lindgren Baltzell

(57) ABSTRACT

The present disclosure relates to systems, devices and methods for eyeglasses frames and eyeglasses frames assemblies for wearable electronic devices, and particularly relates to systems, devices, and methods that employ an antenna in eyeglasses frames and eyeglasses frames assemblies for wearable heads-up displays. In an embodiment, a pair of eyeglasses includes a first arm housing a radio and an antenna passing internally from the radio to at least a portion of a front eyeglass frame, which includes a first and second rim securely physically coupled by a bridge. A power source is coupled to the first arm or a second arm and electrically coupled to the radio via an electrically conductive path.

16 Claims, 15 Drawing Sheets

ANTENNA DESIGNS FOR WEARABLE HEADS-UP DISPLAYS

TECHNICAL FIELD

The present systems, devices, and methods generally relate to eyeglasses frames and eyeglasses frames assemblies (i.e., eyewear) for wearable electronic devices, and particularly relate to systems, devices, and methods that employ an antenna in eyeglasses frames and eyeglasses frames assemblies for wearable heads-up displays.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. Examples of wearable heads-up displays include: the Google Glass®, the Optinvent Ora®, the Epson Moverio®, and the Microsoft Hololens® just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date are bulky to enable adequate display performance and, as a result, appear very unnatural on a user's face compared to the sleeker and streamlined look of typical eyeglass and sunglass lenses. However, a traditional eyeglasses frame is problematic when correct alignment of optical components carried by the eyeglasses frame is a necessity for a high quality display. Because traditional eyeglasses have hinges where the arms meet the rest of the frame, any optical components carried on the arms may move relative to the rest of the frame or to the eye of the user while being worn, resulting in loss of or distortion of the display. There is a need in the art for means to successfully integrate electronic components into smaller frames in order to achieve the inconspicuous form factor and fashion appeal expected of the eyeglass frame industry while still maintaining a high display quality.

Inter-Device Connectivity

Another important factor in the design of electronic devices, including wearable heads-up displays, is the integration of components that allow for communication between devices. Examples of systems that integrate such inter-device connectivity are smart phones, watches, and headphones with Bluetooth® radio antennas. However, the design form factor and location of an antenna within an electronic device is important because the location of the antenna relative to other components, both electronic and non-electronic, within the device impacts the functionality of the antenna. In some cases, interference from other components within the device significantly reduces the range, signal strength, and overall connectivity capabilities of the antenna, thus preventing the antenna from effectively connecting or communicating with other electronic devices. In many cases, a similar result occurs depending on the distance and orientation of the antenna relative to an external device with which the antenna is communicating. As such, there remains a need in the art for integrating radio antennas into a compact, aesthetically-pleasing form factor for a wearable heads-up display in order to maximize connectivity, range, and signal strength of the antenna, regardless of the position of an external device relative to the antenna over a given range.

BRIEF SUMMARY

A first exemplary implementation of an apparatus, such as a glasses form factor for a wearable heads-up display, may be summarized as including: a front eyeglass frame, the front eye glass frame including a first rim having a first upper peripheral portion and a first lower peripheral portion, a second rim having a second upper peripheral portion and a second lower peripheral portion, and a bridge that physically couples the first rim and second rim; a first arm coupled to the first rim and having a first frame portion and a first temple portion; a second arm coupled to the second rim and having a second frame portion and a second temple portion; and an antenna that extends from at least proximate the first frame portion of the first arm along at least a portion of the first rim.

The apparatus may further include: a radio housed in the first temple portion and electrically coupled to the antenna; the antenna extending along the first upper peripheral portion or the first lower peripheral portion; a power source housed in the second temple portion and electrically coupled to the radio by a wire passing through the first rim, the second rim, and the bridge. In an embodiment, the wire extends along the first lower peripheral portion and the second lower peripheral portion and the antenna extends along at least the first upper peripheral portion, while in other embodiments, the wire extends wire extends along the first upper peripheral portion and the second upper peripheral portion and the antenna extends along at least the first lower peripheral portion.

In a further embodiment, the apparatus includes: the wire passing internally through the first rim, the second rim, and the bridge; the antenna passing internally along the first rim at least to the bridge; a first lens mounted in the first rim and a second lens mounted in the second rim; the first arm including a first hinge between the first frame portion and the first temple portion and the second arm including a second hinge between the second frame portion and the second temple portion.

The antenna may extend underneath the first lens, and the wire may extend overtop of the first lens.

The antenna may comprise a coaxial cable having a shielded portion and an exposed portion. The shielded portion of the antenna may extend in or through the first arm and the unshielded portion of the antenna may extend in or through the first rim. The unshielded portion of the antenna may have a length equal to a quarter wavelength of a signal to be transmitted or received by the antenna.

The apparatus may further include display components carried by at least the first arm.

A second exemplary implementation of an apparatus, such as a glasses form factor for a wearable heads-up display, may be summarized as including: a front eyeglass frame including a first rim having a first upper peripheral portion and a first lower peripheral portion, a second rim having a second upper peripheral portion and a second lower peripheral portion, and a bridge connecting the first rim with the second rim; a first arm coupled to the first rim and having a first frame portion and a first temple portion; a radio housed by the first temple portion; a second arm coupled to the second rim and having a second frame portion and a second temple portion; a power source housed by the second temple portion; a first electrically conductive path that electrically couples the radio to the power source, the first electrically conductive path extending along a portion of the second rim, the bridge, and a portion of the first rim; and an antenna communicatively coupled to the radio, the antenna extending along at least a portion of the first rim.

The apparatus may further include: the antenna passing internally from the radio along the first upper peripheral portion of the first rim to at least the bridge; the first electrically conductive path passing internally along the second upper peripheral portion of the second rim, the bridge, and the first upper peripheral portion of the first rim; the first electrically conductive path passing internally along the second lower peripheral portion of the second rim, the bridge, and the first lower peripheral portion of the first rim; the antenna passing internally from the radio along the first lower peripheral portion of the first rim to at least proximate the bridge; the first electrically conductive path passing internally along the second upper peripheral portion of the second rim, the bridge, and the first upper peripheral portion of the first rim; the first electrically conductive path passing internally along the second lower peripheral portion of the second rim, the bridge, and the first lower peripheral portion of the first rim; the first electrically conductive path passing internally along the second lower peripheral portion of the second rim, the bridge, and the first upper peripheral portion of the first rim; and the antenna passing internally from the radio along the first lower peripheral portion of the first rim to at least proximate the bridge.

The antenna may comprise a coaxial cable having a shielded portion and an exposed portion. The shielded portion of the antenna may extend in or through the first arm and the unshielded portion of the antenna may extend in or through the first rim. The unshielded portion of the antenna may have a length equal to a quarter wavelength of a signal to be transmitted or received by the antenna.

The apparatus may further comprise display components carried by at least the first arm.

The apparatus may further comprise a first lens mounted in the first rim; and a second lens mounted in the second rim. The first electrically conductive path may extend through the first rim overtop of the first lens and the antenna may extend through the first rim underneath the first lens. Alternatively, the first electrically conductive path may extend through the first rim underneath the first lens and the antenna may extend through the first rim overtop of the first lens.

A wearable heads-up display ("WHUD") according to some of the teachings herein may be summarized as including a support structure that in use is worn on a head of a user and a display component carried by the support structure. The display component allows the user to view displayed content (i.e., on a transparent combiner) but which also permits the user to see their external environment.

In some cases a transparent combiner is positioned within a field of view of an eye of the user when the support structure is worn on the head of the user.

In some implementations the WHUD includes a laser projector carried by the support structure, the laser projector being is positioned and oriented to scan laser light over at least a first area of the transparent combiner. The support structure may have the shape and appearance of an eyeglasses frame and the transparent combiner may include an eyeglass lens.

Generally WHUD also includes a communication module for communication with other electronic devices. In some implementations, the communication module includes an antenna that is at least partially integrated with the support structure. In some implementations, one or more components of the antenna are integrated within one or more of the support arms of a pair of eyeglasses. In some implementations, one or more components of the antenna are integrated within a rim portion of a pair of eyeglasses, the rim portion supporting one or more eyeglass lenses.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with antennas, displays, portable electronic devices and head-worn devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the implementation or embodiment is included in at least one implementation or embodiment. Thus, the appearances of the phrases "in one implementation" or "in an implementation" or to "in one embodiment" or "in an embodiment" in various places throughout this specification are not necessarily all referring to the same implementation or embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling mediated by one or more additional objects. Thus the term carries and variants such as "carried by" are meant to generally encompass all manner of direct and indirect physical coupling.

The headings and Abstract of the Disclosure provided herein are for convenience only and do not interpret the scope or meaning of the embodiments.

The various embodiments described herein provide systems, devices, and methods for eyeglasses frames and eyeglasses frames assemblies for wearable electronic devices, such as a wearable heads-up display, carrying an antenna for inter-device connectivity. Such glasses include a minimal form factor that is aesthetically pleasing and an antenna design that enables superior range, signal strength, and overall connectivity capabilities of the antenna.

Figure 1:
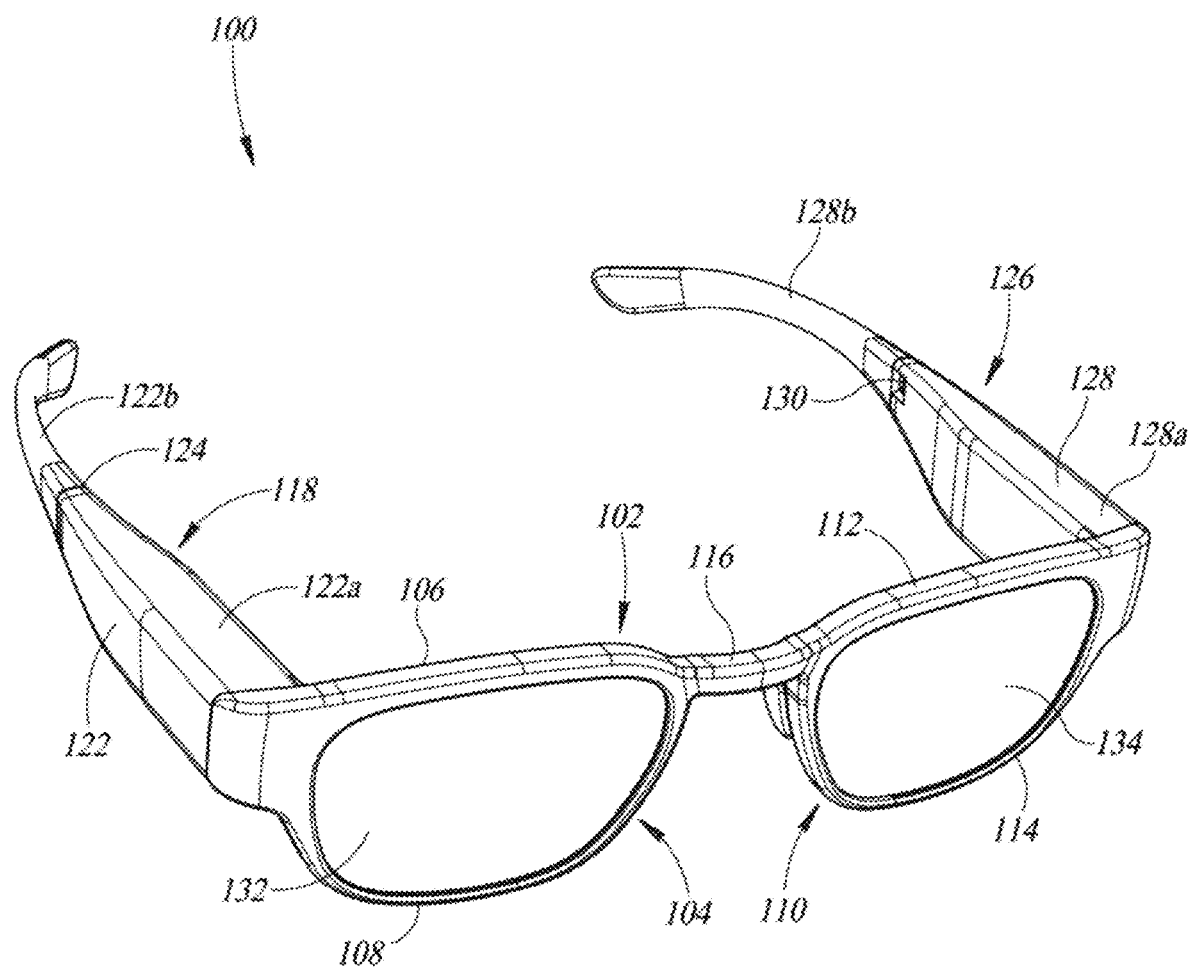
FIG. 1 is a perspective view of an exemplary implementation of a glasses frame formed according to the present disclosure.

FIG. 1 illustrates an exemplary implementation of eyewear in the form of a pair of eyeglasses 100 having a first arm 118, a second arm 126 and a front eyeglass frame 102 formed in accordance with the present disclosure. The front eyeglass frame 102 includes a first rim 104 having a first upper peripheral portion 106 and a first lower peripheral portion 108. The front eyeglass frame 102 further includes a second rim 110 having a second upper peripheral portion 112 and a second lower peripheral portion 114 and a bridge 116 securely physically coupling the first rim 104 and the second rim 110. In an implementation, the bridge 116 is coupled to the first rim 104 and the second rim 110 between the first upper peripheral portion 106 and the second upper peripheral portion 112. In addition, the front eyeglass frame 102 may be formed as a single, unitary, integral piece or as separate components fastened together with one or more adhesives, screws, or other fasteners.

Eyeglasses 100 also include the first arm 118 coupled to the first rim 104 and having a first temple portion 122. Temple portion 122 is preferably hollow in order to house certain components as described herein. In an implementation, first arm 118 is stiff and inflexible such that when first arm 118 is coupled to the front eyeglass frame 102, first arm 118 maintains a fixed position relative to the front eyeglass frame 102. In the illustrated implementation, there is no hinge connecting the arm 118 of the eyeglasses 100 to the front eyeglasses frame 102, in contrast to traditional eyeglasses, although one of skill in the art will appreciate that other implementations include such a hinge.

Further, in an implementation, the first temple portion 122 has a first hinge 124 which separates first temple portion 122 into a first anterior part 122a and a first posterior part 122b, wherein first posterior part 122b folds in towards the front eyeglasses frame 102. In other words, the first hinge 124 is coupled between the first anterior part 122a and the first posterior part 122b such that the first posterior part 122b is rotatable relative to the first anterior part 122a and the front eyeglass frame 102 about the first hinge 124 along at least one axis of rotation passing through the first hinge 124.

The pair of eyeglasses 100 includes a second arm 126 coupled to the second rim 110 having a second temple portion 128. Second temple portion 128 is hollow. In an implementation, second arm 126 is stiff and inflexible such that when second arm 126 is coupled to the front eyeglass frame 102, second arm 126 maintains a fixed position relative to the front eyeglass frame 102. In the illustrated implementation, there is no hinge connecting the second arm 126 of the eyeglasses 100 to the front eyeglasses frame 102, in contrast to traditional eyeglasses.

In an implementation, second temple portion 128 has a second hinge 130 which separates second temple portion 128 into a second anterior part 128a and a second posterior part 128b, wherein second posterior part 128b folds in towards the front eyeglasses frame 102. In other words, the second hinge 130 is coupled between the second anterior part 128a and the second posterior part 128b such that the second posterior part 128b is rotatable relative to the second anterior part 128a and the front eyeglass frame 102 about the second hinge 130 along at least one axis of rotation passing through the second hinge 130.

Temple portions 122 and 128 each preferably sit on, and extend beyond, a respective ear of a user to hold eyeglasses 100 on a head of the user. The front eyeglass frame 102 further includes a first lens 132 mounted in the first rim 104 and a second lens 134 mounted in the second rim 110. As such, front eyeglass frame 102 has the shape and appearance of a front of a traditional pair of eyeglasses. Lenses 132 and 134 may be inserted and held in respective rims 104 and 110 by an interference fit, friction fit, press fit, or by a heat/shrink fit. Each of rims 104 and 110 is of a size and shape that can receive the respective lens 132 and 134 and hold the lenses 132 and 134 in place without any movement once the lenses 132 and 134 are inserted. Assembly of the eyeglasses 100 may include the technology described in U.S. Provisional Patent Application Ser. No. 62/609,607 and/or U.S. Provisional Patent Application Ser. No. 62/634,654.

In an implementation, eyeglasses 100 are a wearable heads-up display wherein display-producing components are present within or carried by one or both arms 118 and 126 (e.g., one arm for a monocular display, both arms for a binocular display) and display components are embedded within or carried by one or both lenses 132 and 134. In addition, as described in more detail below, the eyeglasses 100 may include an antenna (not shown) and a power source (not shown) to power circuitry (e.g., processor, radio (e.g., transmitter, receiver or transceiver coupled to one or more antenna)) in order to provide inter-device connectivity between the glasses 100 and external electronic devices, such as a smart phone (not shown) or a ring worn on the user's finger that implements the technology described in U.S. Provisional Patent Application Ser. No. 62/236,060, U.S. Non-Provisional patent application Ser. No. 15/282,535 (now US Patent Application Publication 2017/0097753), and U.S. Non-Provisional patent application Ser. No. 15/799,642 (now US Patent Application Publication 2018/0067621).

In an implementation, the arms 118 and 126 carry certain display-producing components, for example one or more of a projector (e.g., a scanning laser projector with laser diodes), or may be a micro-display (e.g., liquid crystal display (LCD) or organic light emitting diode (OLED) display). The display components embedded in the lenses 132 and 134 may be a waveguide which receives light from the display-producing components and guides the light towards an eye of the user, or may be a reflector, refractor, or diffractor, for example a holographic optical element. The fixed position of at least the anterior portions 122a and 128a of the arms 118 and 126 relative to the front eyeglasses frame 102 may enable correct initial and "in-use" positioning of components such as the projector and holographic optical element, in implementations where such components are used.

Figure 2:
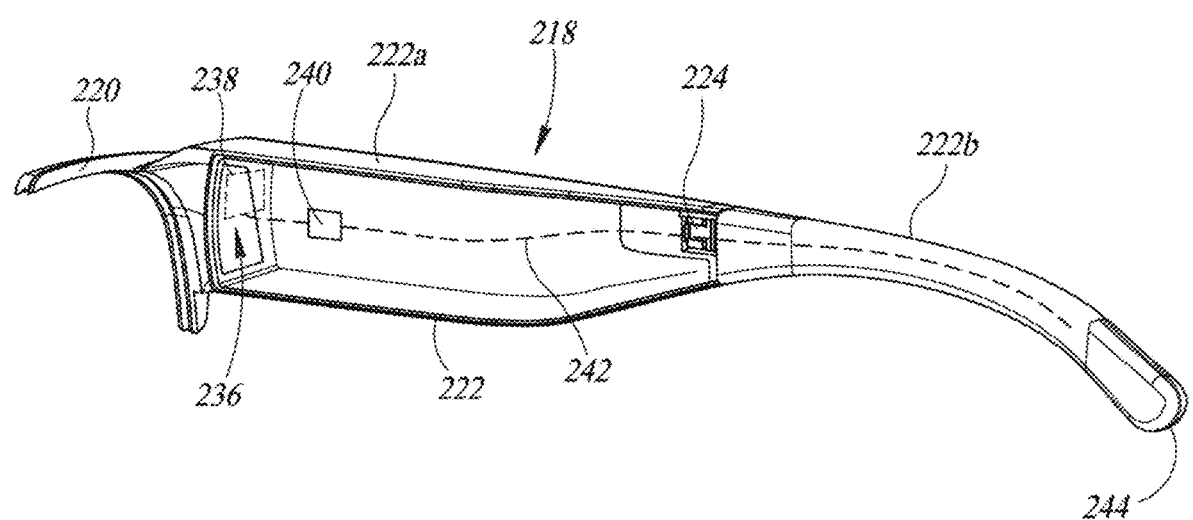
FIG. 2 is a perspective view of an exemplary implementation of a first arm of a glasses frame according to the present disclosure having an antenna housed in the arm.

Referring now to FIG. 2 with continuing reference to FIG. 1, illustrated therein is a perspective view of an exemplary implementation of a first arm 218 of a pair of eyewear, such as eyeglasses 100. One of skill in the art will appreciate that the first arm 218 can be substantially similar to first arm 118 or second arm 126 in FIG. 1. Accordingly, the features described with reference to first arm 218 may be incorporated into implementations of first arm 118 or second arm 126, or both, in eyeglasses 100, as well as in other implementations disclosed herein.

First arm 218 includes a first frame portion 220 and a first temple portion 222. Temple portion 222 is hollow and has a first aperture 236 at the front to allow for components of a wearable heads-up display to be inserted through first aperture 236 and placed within eyewear, for example eyeglasses 100, as described herein. First frame portion 220 is preferably stiff and inflexible such that when first frame portion 220 is coupled to the front eyeglass frame 102, first arm 218 maintains a fixed position relative to the front eyeglass frame 102. First frame portion 220 and first temple portion 222 may be formed as a single, unitary, integral component or may be two components which are combined to make first arm 218. In the implementation illustrated in FIG. 2, first frame portion 220 is attached to first temple portion 222 with screws but one of skill in the art will appreciate that other fasteners may be used (e.g., bolts, rivets, adhesive, epoxy, etc.).

First arm 218 further includes a first hinge 224, which separates the first temple portion 222 into a first anterior part 222a and a first posterior part 222b. However, in some implementations, the first arm 218 does not include the first hinge 224, in which case the anterior and posterior parts 222a and 222b are simply anterior and posterior portions of the temple portion 222.

In FIG. 2, a radio (in other words, a wireless communications module) 240 is housed within the first arm 218, and preferably within the first temple portion 222 and even more preferably within the first anterior part 222a of the first temple portion 222. In some implementations, the radio 240 may be coupled to a printed circuit board (not shown) housed in the first temple portion 222, in which case, the radio 240 is in electrical communication with electrically conductive traces of the printed circuit board (not shown). In an implementation, the radio 240 can take the form of a transmitter and, or, receiver, or a transceiver. An antenna, represented by dashed lines 242, is electrically coupled to and in electrical communication with the radio 240. The radio 240 and antenna(s) are operable to provide wireless communications in the radio frequency and, or microwave frequency bands of the electromagnetic spectrum.

In an implementation, the antenna 242 extends from the radio 240 in the first anterior portion 222a, through the first anterior portion 222a to at least the first posterior portion 222b. In other implementations, the antenna 242 extends through the first hinge 224 toward a distal end 244 of the first arm 218, while in other implementations, the first hinge 224 is not present and thus the antenna 242 extends through the first arm 218 toward the distal end 244 of the first arm 218 without passing through the hinge 224. In still further implementations, the antenna 242 extends from the radio 240 to terminate proximate the distal end 244 of the first arm 218. While the antenna 242 is illustrated in FIG. 2 as a dashed line, one of skill in the relevant art will appreciate that the antenna 242 can be a variety of geometric shapes with varying cross sections.

For example, in various implementations, the antenna 242 has a circular, ovular, triangular, rectangular, or square cross section along its length. In addition, in certain other implementations, the antenna 242 changes size along its length, for example, a dimension between outer surfaces of the antenna 242 proximate the radio 240 may be greater than, equal to, or less than, a dimension between outer surfaces of the antenna 242 proximate the distal end 244. Still further, the antenna 242 can change size and or shape along its length, such that in an implementation, the antenna 242 is continuously tapered along at least a portion of its length or all of its length, while in other implementations, a greatest dimension between exterior surfaces of the antenna 242 along its length changes multiple times, such as in a "step-down" configuration. Still further, the antenna 242 can include different cross sections along its length along with one or more transitions, for example, a portion of the antenna 242 proximate the radio 240 may have a square cross section, a portion of the antenna 242 proximate its mid-point may have a triangular cross section, and a portion of the antenna 242 proximate the distal end 244 may have a circular cross section. Accordingly, implementations of the present disclosure encompass a wide variety of shapes and configurations of the antenna 242.

In other alternative implementations of the antenna, represented by dashed lines 238, the antenna 238 extends from the radio 240 to terminate in, or proximate to, the first aperture 236. In an implementation where the antenna 238 terminates in the first aperture 236, the antenna 238 occupies a portion of, or substantially all of, the first aperture 236 and may have a substantially rectangular shape, although other geometric shapes are possible. For example, antenna 238 may be a circle, a square, an oval, a triangle, a trapezoid, a pentagon, a hexagon, or an octagon, among others. Further, the antenna 238 may be connected to radio 240 with a portion of the antenna 238 having any of the above shapes, features or configurations disclosed above with reference to the implementation of the antenna represented by dashed lines 242.

Figure 3A:
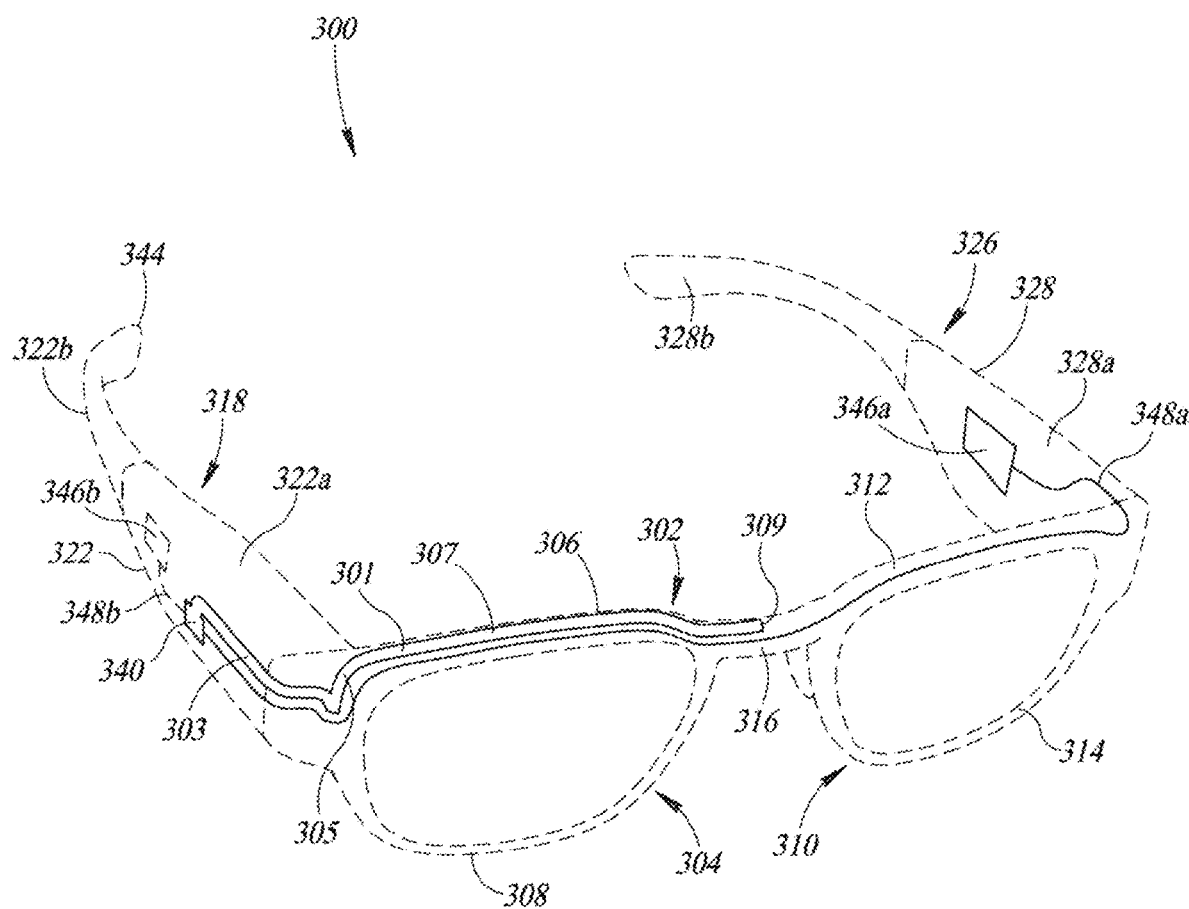
FIG. 3A is a perspective view of an alternative exemplary implementation of a glasses frame formed according to the present disclosure and having an antenna housed in the frame.
Figure 3B:
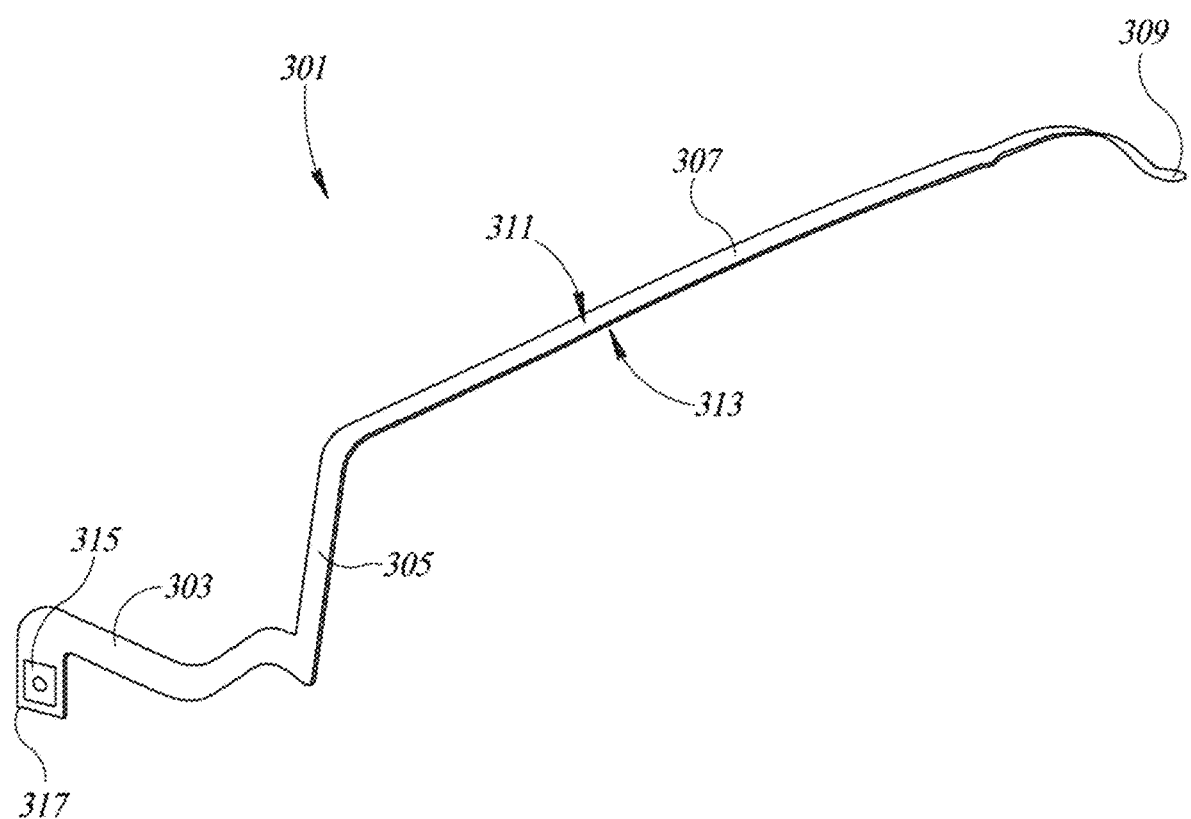
FIG. 3B is a perspective view of the antenna of FIG. 3A.

In addition, implementations of the present disclosure include an antenna, a power source, and an electrically conductive path or wire placed in various locations within a front frame of eyewear. For example, FIG. 3A is a perspective view of an exemplary implementation of eyeglasses 300, which may be, in an implementation, substantially similar in structure to eyeglasses 100, having an antenna 301 incorporated in the eyeglasses 300. FIG. 3B is a perspective view of the antenna 301 showing features of the antenna 301 in more detail. For ease of recognition in the drawings, eyeglasses 300 are represented by dashed lines and certain internal features, such as the frame portions and apertures of arms 318, 326 are not shown, although one of skill in the art will appreciate that such features are present within implementations of the eyeglasses 300.

The eyeglasses 300 include first and second arms 318 and 326 coupled to a front eyeglass frame 302. The front eyeglass frame 302 includes a first rim 304 and a second rim 310 securely physically coupled by a bridge 316. A radio 340 is housed internally in a first temple portion 322 of the first arm 318, and preferably within a first anterior portion 322a of the first temple portion 322 of the first arm 318. The radio 340 is electrically coupled to, or in electrical communication with the antenna 301, which passes internally through the eyeglasses 300 and front eyeglass frames 302 of the eyeglasses 300 as discussed below.

The antenna 301 extends from the radio 340 at least proximate the first temple portion 322 and the first frame portion (not shown) of the first arm 318, through the first aperture (not shown) and along at least a portion of the first rim 304. In an implementation, the antenna 301 terminates at any location within the first rim 304, while in the implementation illustrated in FIG. 3A, the antenna 301 extends from the radio 340 in the first arm 318 along a first upper peripheral portion 306 of the first rim 304 to terminate proximate the bridge 316. In a further implementation, the antenna 301 terminates in the bridge 316, or in other words, a second distal end 309 is a terminal end of antenna 301 and is positioned internally within the bridge 316 when the eyeglasses are in an operational or assembled state. In this configuration, a first portion 303 of the antenna 301 is housed at least partially in the first temple portion 322 of the first arm 318 and a second and third portion 305 and 307 of the antenna 301 are housed at least partially in the first frame 304, and more preferably within the first upper peripheral portion 306 of the first frame 304.

One of skill in the art will also appreciate that although not specifically shown, the antenna 301 can extend beyond the bridge 316 to terminate within the second rim 310. For example, in an implementation, the antenna 301 extends from the radio 340, through the first upper peripheral portion 306 of the first rim 304, through the bridge 316 to terminate within either a second upper peripheral portion 312 or a second lower peripheral portion 314 of the second rim 310. One of skill in the art will also appreciate that the antenna 301 can pass internally from the radio 340, through the first aperture (not shown) of the first arm 318 to at least a first lower peripheral portion 308 of the first rim. In such an implementation, the antenna 301 terminates within the first lower peripheral portion 308, within the bridge 316 as above, or beyond the bridge 316 to a location within the second rim 310. In implementations where the antenna 301 passes through the first lower peripheral portion 308 of the first rim 304 and extends beyond the bridge 316, the antenna 301 can terminate within the second upper peripheral portion 312 or the second lower peripheral portion 314 of the second rim 310. It is even possible, in an implementation, to extend the antenna from the first arm 318, through the first rim 304, the bridge 316, and the second rim 310 to terminate within the second arm 326.

FIG. 3A further illustrates a power source 346a. In a preferred implementation, the power source 346a is housed internally within a second temple portion 328 of the second arm 326, and more preferably within a second anterior portion 328a of the second temple portion 328 of the second arm 326. The power source 346a may be a portable power source, such as a battery or a super-capacitor (i.e., capacitor with capacitance on the order of 0.01 F or greater). In addition, where the power source 346a is a battery, the battery can be rechargeable (i.e., a user inserts an external charging cord into glasses 300 to charge the battery comprising the power source 346a), or replaceable (i.e., the glasses 300 include a removable cover for removing and replacing the battery or batteries comprising the power source 346a). In implementations where the power source 346a is one or more replaceable batteries, circuitry may be housed within either of the arms 318 and 326, and more specifically within either of the first and second temple portions 322 and 328, to receive the battery or batteries and provide an electrical connection between the battery or batteries and the radio 340. In other words, the circuitry is communicatively coupleable to the replaceable battery or batteries comprising the power source 346a. However one of skill in the art will appreciate that in implementations where the power source 346a is a rechargeable battery or a super-capacitor, the same or substantially similar circuitry may be present to connect the power source 346a to the radio 340. The power source 346a is electrically coupled to the radio 340 by wire 348a to transmit electric current from the power source 346a to power the radio 340, as well as any other electronic components housed within the first temple portion 322 of the first arm 318.

In an implementation, the wire 348a passes internally from the power source 346a housed within the second temple portion 328, through a second aperture (not shown) in the second arm 326, the second rim 310, the bridge 316, the first rim 304, the first aperture (not shown) to the radio 340 in the first temple portion 322. As with the antenna 301, the wire 348a can pass through any of the elements of the front eyeglass frame 302, irrespective of the location of the antenna 301. For example, in various implementations the wire 348a passes internally through the second upper peripheral portion 312 of the second rim 310, the bridge 316, and the first upper peripheral portion 306 of the first rim 304. In other implementations, the wire 348a passes through the second lower peripheral portion 314, the bridge 316, and the first upper peripheral portion 306 of the first rim 304. In alternative implementations, the wire 348a passes through the second upper peripheral portion 312, the bridge 316, and the first lower peripheral portion 308. Accordingly, implementations of the present disclosure are not limited by the path of the wire 348a through the front eyeglass frame 302.

In other variations, the power source and wire are located within the first temple portion 318 along with the radio 340, as represented by dashed lines 346b and 348b, respectively. In such an implementation, the wire 348b preferably does not pass through any portion of the front eyeglass frame 302. Rather, the power source 346b is housed proximate the radio 340 and electrically coupled to radio 340 by wire 348b. It may even be possible to include the power source 346b within a first anterior portion 322b of the first temple portion 322 or a second anterior portion 328b of the second temple portion 328. In other words, in an implementation, the power source 346b is located within the first anterior portion 322b proximate a distal end 344 of the first arm 318 or within the second anterior portion 328b of the second temple portion 328.

FIG. 3B is a perspective view of the antenna 301. In other words, FIG. 3B illustrates an implementation of the antenna 301 that is capable of extending through various parts of the front eyeglass frame 302 as described with reference to FIG. 3A. With continuing reference to FIGS. 3A-B, the antenna 301 includes the first portion 303, the second portion 305, and the third portion 307 extending between first and second distal ends 317 and 309. The antenna 301 is preferably a single, unitary, integral piece comprised of portions 303, 305, and 307. In an implementation, the first portion 300 is substantially perpendicular to second portion 305 and third portion 307 is substantially perpendicular to second portion 305. The antenna 301 and portions 303, 305, and 306 preferably have a size and a shape to extend from the first arm 318, through the first aperture (not shown) and into the front eyeglass frame 302. The antenna 301 further includes opposing surfaces 311 and 313, wherein the opposing surfaces 311 and 313 are each substantially flat and planar along at least a portion of their length, or in some implementations, substantially all of their length. A connector 315 is coupled to the antenna 301, or formed as a single, unitary, integral component of the antenna 301, proximate the first distal end 317 for enabling connection with the radio 340.

In addition, implementations of the present disclosure include the antenna 301 having a variety of geometric shapes and orientations. For example, in various implementations, the antenna 301 has a circular, ovular, triangular, rectangular, or square cross section along its length, or along at least a portion of its length. In addition, in certain other implementations, the antenna 301 changes size along its length, for example, a dimension between outer surfaces 311, 313 of the antenna 301 proximate the first distal end 317 may be greater than, equal to, or less than, a dimension between outer surfaces 311, 313 of the antenna 301 proximate the distal end 317. Additionally or alternatively, the antenna 301 can change shape along its length, such that in an implementation, the antenna 301 is continuously tapered along at least a portion of its length or all of its length, while in other implementations, a greatest dimension between exterior surfaces 311, 313 of the antenna 301 along its length changes multiple times, such as in a "step-down" configuration (i.e. a first dimension between outer surfaces 311, 313 is greater than a second dimension, which is greater than a third dimension, and so on). Still further, the antenna 301 can include different cross sections along its length along with one or more transitions, for example, the first portion 303 of the antenna 301 proximate the first distal end 317 may have a square cross section, the second portion 305 may have a triangular cross section, and the third portion 307 may have a circular cross section.

In other implementations, the antenna 301 may include one or more curved or bent portions along its length, as well as portions which are substantially flat and planar. For example, a height of the antenna 301 relative to the first distal end 317 may increase from the first distal end 317 to the first portion 303 and remain relatively constant through the first portion 303, increase in the second portion 305 and remain constant in the second portion 305, and remain constant in the third portion 307 relative to an upper portion of the second portion 305. In other implementations, the opposite may be true (i.e. the first distal end 317 is the highest point relative to other portions of the antenna 301). In still further implementations, each of the portions 303, 305, and 307 between distal ends 317 and 309 may be curved, recessed, angled or indented relative to other portions. For example, in FIG. 3B, the second distal end 309 is angled and of a lower height relative to a highest point of the third portion 307. Accordingly, implementations of the present disclosure encompass a wide variety of shapes and configurations of the antenna 301. As such, implementations of the present disclosure include the antenna 301 having any potential geometric shape and configuration to correspond to implementations of the eyeglasses 300.

In an implementation, the antenna 301 is electrically coupled to the radio 340 and operative to wirelessly transmit radio frequency signals that embody an established wireless communication protocol, for example, without limitation: Bluetooth®, Bluetooth® Low-Energy, Bluetooth Smart®, ZigBee®, WiFi®, Near-Field Communication (NFC), or the like. Such protocols typically employ radio frequency signals in the range of 1 GHz to 10 GHz (with the exception of NFC, which operates in the 10 MHz-20 MHz range) and may include pairing or otherwise establishing a wireless communicative link between an apparatus, such as a wearable heads-up display carrying the antenna 301, and another external electronic device.

Figure 4A:
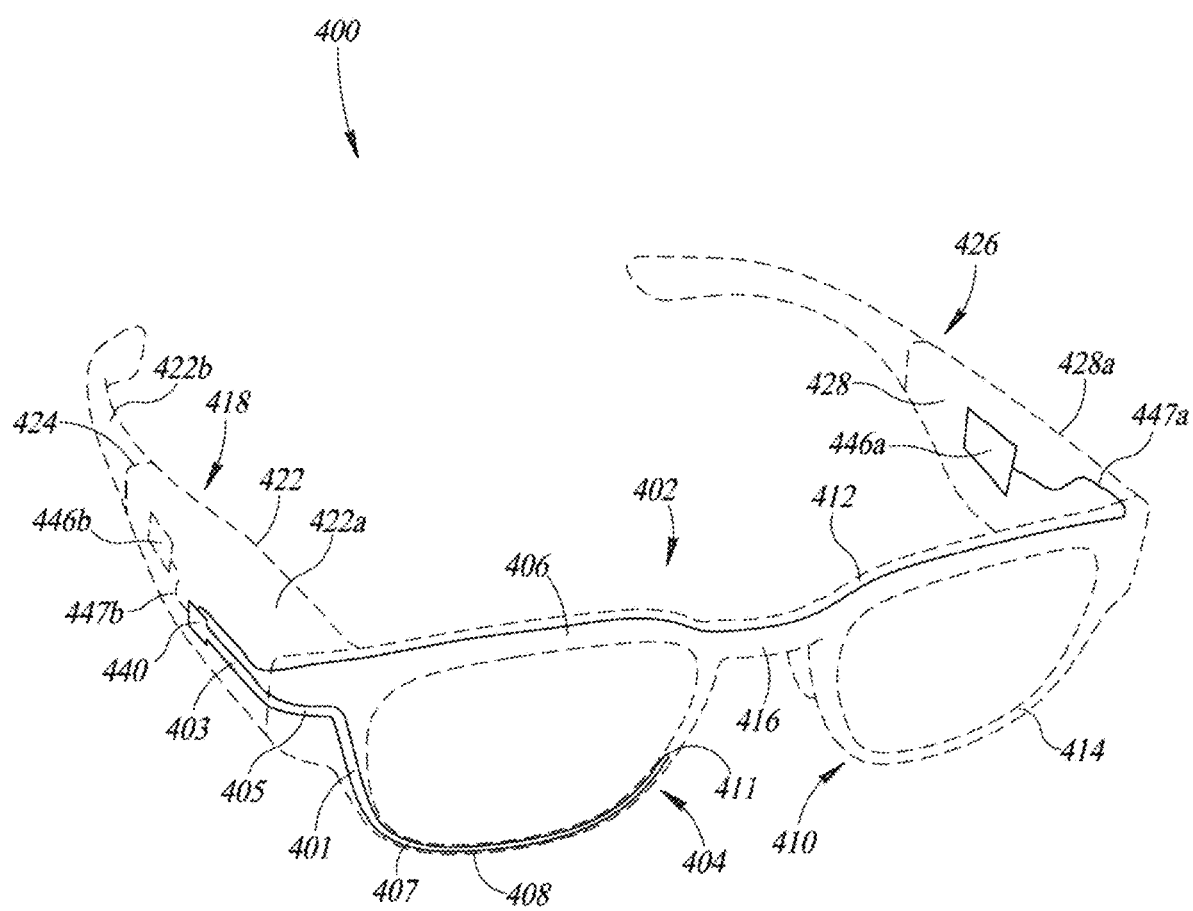
FIG. 4A is a perspective view of an alternative exemplary implementation of a glasses frame formed according to the present disclosure and having an antenna housed in the frame.
Figure 4B:
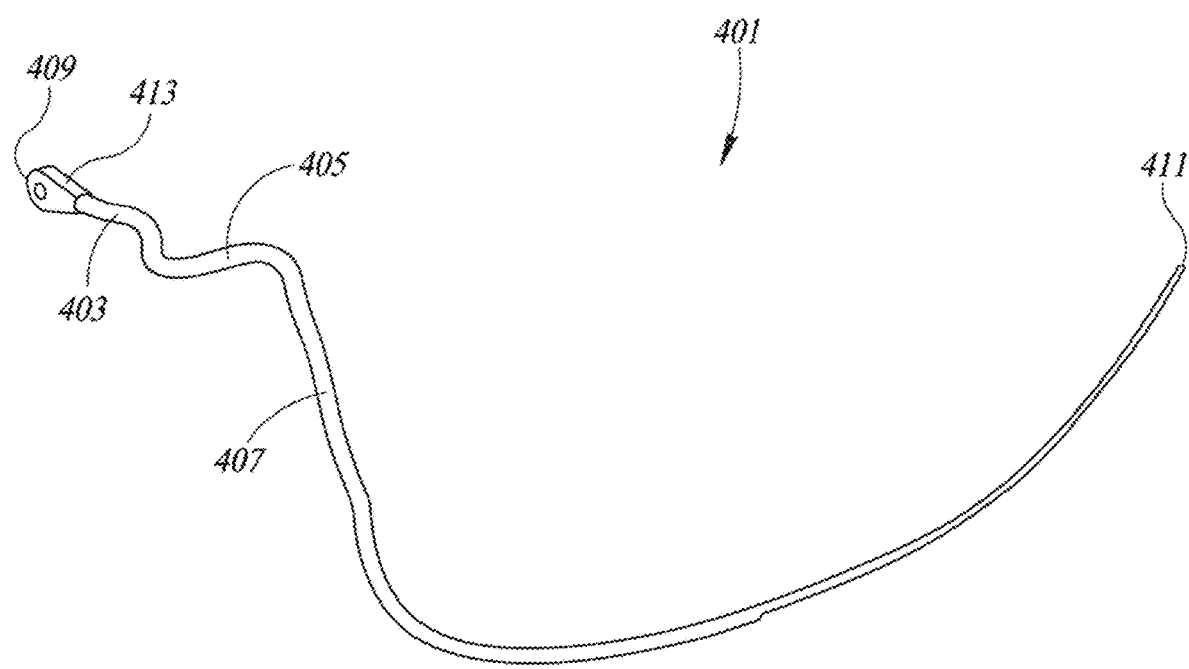
FIG. 4B is a perspective of the antenna of FIG. 4A.

FIG. 4A is a perspective view of an alternative exemplary implementation of eyeglasses 400, which may be, in an implementation, substantially similar in structure to eyeglasses 100, having an antenna 401 incorporated in the eyeglasses 400. FIG. 4B is a perspective view of the antenna 401 showing features of the antenna 401 in more detail. For ease of recognition in the drawings, eyeglasses 400 are represented by dashed lines and certain internal features, such as the frame portions and apertures of arms 418 and 426 are not shown, although one of skill in the art will appreciate that such features are present within implementations of the eyeglasses 400.

The eyeglasses 400 include first and second arms 418 and 426 coupled to a front eyeglass frame 402. The front eyeglass frame 402 includes a first rim 404 having a first upper peripheral portion 406 and a first lower peripheral portion 408 and a second rim 410 having a second upper peripheral portion 412 and a second lower peripheral portion 414. The first rim 404 is securely physically coupled to the second rim 410 by a bridge 416. The first arm 418 includes a first temple portion 422, which may be separated into a first anterior portion 422a and a first posterior portion 422b by a hinge 424, as described herein. Similarly, the second arm 426 includes a second temple portion 428, which may include a second anterior portion 428a.

In the illustrated implementation, a radio 440 is housed within the first temple portion 422 of the first arm 418, and more preferably, within the first anterior portion 422a, although it may also be possible to house the radio 440 in a first posterior portion 422b of the first temple portion 422. In the illustrated implementation, the antenna 401 is communicatively coupled to the radio 440 and extends internally along at least a portion of the first rim 404. In other implementations, the antenna 401 extends internally from the radio 440, through part of the first temple portion 422, through the first aperture (not shown), and along the first lower peripheral portion 408 to terminate proximate the bridge 416. In other words, in this implementation, a second distal end 411 of the antenna 401 is located within the first rim 404, and more specifically proximate the first lower peripheral portion 408 and the bridge 416.

It is also possible for the antenna 401 to extend along the first lower peripheral portion 408 and beyond the bridge 416 to terminate in either the second upper peripheral portion 412 or the second lower peripheral portion 414. Similarly, it is possible for the antenna 401 to extend along at least a portion of the first upper peripheral portion 406 to terminate proximate the bridge 416, within the bridge 416, or terminate beyond the bridge 416 in either the second upper peripheral portion 412 or the second lower peripheral portion 414, although not specifically shown. Further, in an implementation, the antenna 401 extends around only the first rim 404, such that the antenna 401 extends along the first lower peripheral portion 408 to terminate with the first upper peripheral portion 406. Accordingly, the antenna 401 may extend along any portion of the front eyeglass frame 402 and terminate with the same, or a different portion of any part of the front eyeglass frame 402.

In the illustrated implementation, the antenna 401 includes a first portion 403, second portion 405, and third portion 407. The first portion 403 is located at least partially within the first temple portion 422, the second portion 405 is located at least partially in the first rim 404, and the third portion 407 is located at least partially within the first lower peripheral portion 408 of the first rim 404.

FIG. 4A also illustrates a power source 446a, which may be a portable power source, such as a battery or a supercapacitor, as above. The power source 446a is electrically coupled to the radio 440 by a first electrically conductive path 447a extending along a portion of the second rim 410, the bridge 416, and a portion of the first rim 404. In other implementations, the first electrically conductive path 447a passes internally along the second lower peripheral portion 414, the bridge 416 and the first upper peripheral portion 406 of the first rim 404, while in further alternative implementations, the first electrically conductive path 447a passes internally along the second lower peripheral portion 414 of the second rim 410, the bridge 416, and the first lower peripheral portion 408 of the first rim 404. The first electrically conductive path 447a may also pass internally along the second upper peripheral portion 412, the bridge 416, and the first upper peripheral portion 406 of the first rim 404.

In addition, it is possible to have the power source, represented by dashed lines 446b, located in the first temple portion 422, which is to say that the power source 446b can be located in the same arm 418 as other electronic components, such as the radio 440, or display producing components, and a second electrically conductive path 447b electrically couples the radio 440 to the power source 446b. In this case, the second electrically conductive path 447b extends along at least a portion of the first arm 418, or more preferably, along at least a portion of the first temple portion 422 and does not necessarily extend along any portion of the front eyeglass frame 402. Further, the first and second electrically conductive paths 447a and 447b may be wires, although other materials capable of transmitting electric energy may be used. Accordingly, one of skill in the art will appreciate that the implementations of the present disclosure are not limited by the placement of the electrically conductive paths 447a and 447b and the antenna 401 within the eyeglasses 400. Rather, any of the locations of the antennas 142, 301 and 401 may be used along with any combination of the electrically conductive paths 447a and 447b either internal to, or external to the eyeglasses 400.

In the illustrated implementation of FIG. 4A, antenna 401 (more specifically, third portion 407 thereof) extends through the first lower peripheral portion 408 of first rim 404 and electrically conductive path 447a extends through first upper peripheral portion 406 of first rim 404. This arrangement can be advantageous to reduce interference effects that electrical power conducted through electrically conductive pathway 447a may have on the performance of antenna 401. For example, in some implementations, positioning antenna 401 and electrically conductive pathway 447a in close proximity to one another (and, e.g., in a parallel arrangement) such as in the case where electrically conductive pathway 447a and antenna 401 (more specifically, third portion 407 thereof) are both carried in (i.e., extending through) the same portion of rim 404 (e.g., in the case where electrically conductive pathway 447a and third portion 407 of antenna 401 are both carried in first upper peripheral portion 406 of first rim 404 or both carried in first lower peripheral portion 408 of first rim 404) can degrade the performance of antenna 401. Thus, when electrically conductive pathway 447a is carried in first upper peripheral portion 406, third portion 407 of antenna 401 may advantageously be carried in first lower peripheral portion 408, and when electrically conductive pathway 447a is carried in first lower peripheral portion 408, third portion 407 of antenna 401 may advantageously be carried in first upper peripheral portion 408. More generally, when electrically conductive pathway 447a extends through a first portion of rim 404, third portion 407 of antenna 401 may advantageously extend through a second portion of rim 404 to maximize the distance between electrically conductive pathway 447a and third portion 407 of antenna 401 in order to reduce electromagnetic interference therebetween.

One of skill in the art will further appreciate that at least one of the arms 418 and 426 or more preferably at least one of the temple portions 422 and 428 may house additional electronic components, such as one or more display-producing components, a printed circuit board, a processor, and a non-transitory processor-readable storage medium or memory, among others. Further, one of skill in the art will appreciate that the arms 418 and 426 and the front eyeglass frame 402 may be formed of various materials, for example various plastics (i.e., zylonite or cellulose acetate, cellulose acetate propionate, nylon, blended nylon, castor oil-based plastics) or metals (i.e., stainless steel, aluminum, titanium, monel, flexon, beryllium, and alloys of any of the above in combination with other metals), among others. Further, although the antenna 401 and radio 440 are illustrated herein as being housed in the first temple portion 422, one of skill in the art will understand that the antenna 401 and radio 440 can be housed in the second temple portion 428, or in other locations with the eyeglasses 400.

FIG. 4B is a perspective view of the antenna 401. In other words, FIG. 4B illustrates an implementation of the antenna 401 that is capable of extending through various parts of the front eyeglass frame 402 as described with reference to FIG. 4A. With continuing reference to FIGS. 4A-B, the antenna includes the first portion 403, the second portion 405, and the third portion 407. Preferably, the antenna 401 is formed as a single, unitary, integral component comprised of portions 403, 405, and 407 extending between a first distal end 409 and a second distal end 411. In an implementation, the second portion 405 is substantially perpendicular to the third portion 407. The antenna 401 and portions 403, 405, and 407 preferably have a size and a shape to extend from the first arm 418, through the first aperture (not shown) and into the front eyeglass frame 402. The antenna 401 further includes a connector 412 proximate the first distal end 4009 for enabling connection with the radio 440.

In some implementations, antenna 401 may advantageously be formed of a coaxial cable comprising an internal conductor surrounded by a conducting shield. In such implementations, first portion 403 and second portion 405 of antenna 401 may each include both the internal conductor and the conducting shield, but third portion 407 of antenna 401 may have the conducting shield removed to expose the internal conductor. In other words, antenna 401 may be formed of a coaxial cable in which first portion 403 and second portion 405 are both shielded (e.g., electromagnetically shielded from other electrical components in the system) by the conducting shield of the coaxial cable and in which third portion 407 has the conducting shield removed to expose an "active" portion of antenna 401 (i.e., active in the sense of "acting" as an antenna). Advantageously, the active or exposed portion 407 of antenna 401 may have a length that is about equal to a quarter wavelength of the signal(s) being transmitted/received by antenna 401, or more generally, a length that is equal to $n\lambda/2$, wherein $\lambda$ is the wavelength of a signal guided and n is an integer.

In addition, implementations of the present disclosure include the antenna 401 having a variety of geometric shapes and orientations. For example, in various implementations, the antenna 401 has a circular, ovular, triangular, rectangular, or square cross section along its length, or along at least a portion of its length. In addition, in certain other implementations, the antenna 401 changes size along its length, for example, a dimension between outermost surfaces of the antenna 401 proximate the first distal end 409 may be greater than, equal to, or less than, a dimension between outermost surfaces of the antenna 401 proximate the second distal end 411. Still further, the antenna 401 can change shape along its length, such that in an implementation, the antenna 401 is continuously tapered along at least a portion of its length or all of its length, while in other implementations, a greatest dimension between outermost surfaces of the antenna 401 along its length changes multiple times, such as in a "step-down" or a "step-up" configuration (i.e. a first dimension between outermost surfaces is greater than or less than a second dimension, which is greater than or less than a third dimension, and so on). Still further, the antenna 401 can include different cross sections along its length along with one or more transitions, for example, the first portion 403 of the antenna 401 proximate the first distal end 409 may have a square cross section, the second portion 405 may have a triangular cross section, and the third portion 407 may have a circular cross section.

In other implementations, the antenna 401 may include one or more curved or bent portions along its length, as well as portions which are substantially flat and planar. For example, a height of the antenna 401 relative to the first distal end 409 may increase from the first distal end 409 to the first portion 403 and remain relatively constant through the first portion 403, increase in the second portion 405 and remain constant in the second portion 405, and remain constant in the third portion 407. In the illustrated implementation, the opposite may be true. For example, the first distal end 409 is the highest point relative to other portions of the antenna 401. In still further implementations, each of the portions 403, 405, and 407 between distal ends 409 and 411 may be curved, recessed, angled or indented relative to other portions. Accordingly, implementations of the present disclosure encompass a wide variety of shapes and configurations of the antenna 401. As such, implementations of the present disclosure include the antenna 401 having any potential geometric shape and configuration to correspond to implementations of the eyeglasses 400.

In an implementation, the antenna 401 is electrically coupled to the radio 440 and operative to wirelessly transmit radio frequency signals that embody an established wireless communication protocol, for example, without limitation: Bluetooth®, Bluetooth® Low-Energy, Bluetooth Smart®, ZigBee®, WiFi®, Near-Field Communication (NFC), or the like. Such protocols typically employ radio frequency signals in the range of 1 GHz to 10 GHz (with the exception of NFC, which operates in the 10 MHz-20 MHz range) and may include pairing or otherwise establishing a wireless communicative link between an apparatus, such as a wearable heads-up display carrying the antenna 401, and another external electronic device.

The various implementations described herein provide a compact, aesthetically pleasing glasses form factor that includes an antenna and a radio for enabling inter-device connectivity. Further, because a location, orientation and position of the antenna is adjustable relative to other electrical components, such as a power source and an electrically conductive path, interference between the antenna and other components within the eyeglass is minimized. As a result, implementations of the present disclosure allow for optimization of the connectivity, range, and signal strength of the antenna when transmitting or receiving signals from other electronic devices. In particular, implementations of the present disclosure enable optimal connectivity, range, and signal strength characteristics for the antenna and the radio regardless of the position of an external device within a given range.

Figure 5:
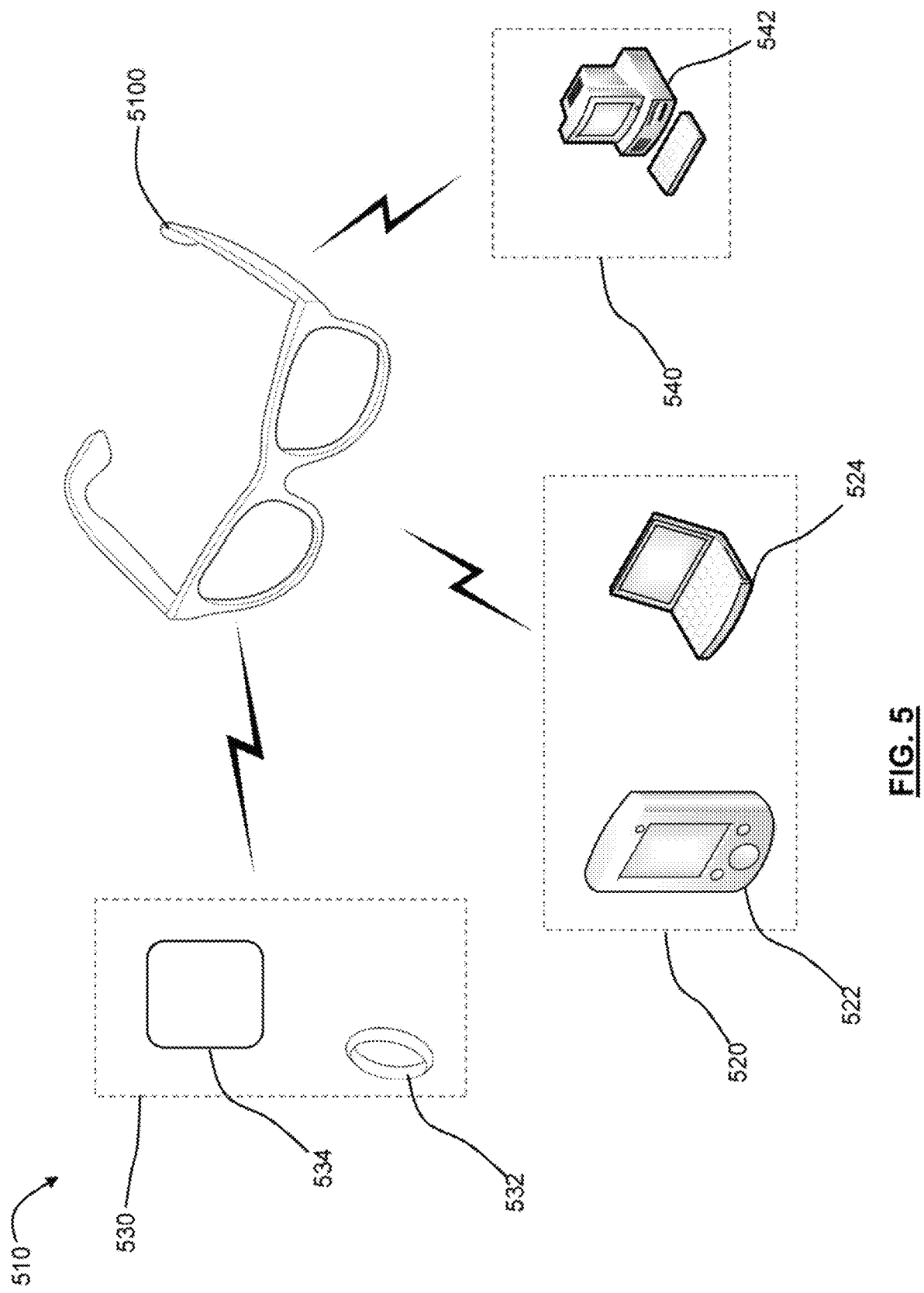
FIG. 5 is a schematic diagram of a system incorporating a wearable heads-up display in communication with at least one other electronic device in accordance with the present systems, devices, and methods.

Turning now to FIG. 5, illustrated therein is a system 510 incorporating a wearable heads-up display ("WHUD") 500 in wireless communication with at least one other electronic device in accordance with the present systems, devices, and methods. In particular, in this implementation the WHUD 5100 may be in wireless communication with one or more portable electronic devices 520, such as a smartphone 522 or a laptop 524. Other exemplary portable electronic devices could include an audio player, a tablet computer, an ebook reader, and so on.

As shown, in this implementation the WHUD 5100 may also be in wireless communication with one or more wearable electronic devices 530, such as an electronic ring 532 or other wearable device 534. Generally, a wearable electronic device may be attached or coupled to the user by a strap or straps, a band or bands, a clip or clips, an adhesive, a pin and clasp, an article of clothing, tension or elastic support, an interference fit, an ergonomic form, etc. Other examples of wearable electronic devices include digital wristwatches, electronic armbands, electronic ankle-bracelets or "anklets", hearing aids, and so on.

As also shown, in this implementation the WHUD 5100 may also be in wireless communication with one or more other electronic devices 540 that are generally considered to be non-portable electronic devices, such as a computer workstation 542. Other examples of such electronic devices could include objects with a large mass or which are generally difficult for a user to hold and carry either due to the size and configuration, or being attached to something, and could include smart televisions, vehicles, smart devices (e.g., appliances such as smart fridges, smart thermostats, or hazardous condition detectors such as smoke alarms), and so on.

Generally speaking, the WHUD 5100 and electronic devices 520, 530, and 540 are in wireless communication to permit the exchange of data therebetween, which could include the exchange of control data, media data, information to be displayed to the user of the WHUD 5100 (i.e., via the display), or other types of data. For instance, the electronic ring 532 could be in wireless communication with the WHUD 5100 to control information being displayed on the transparent combiner of the WHUD 5100. This could allow a user to cycle through a menu of possible commands, for instance, or take some other action.

In some instances, one or more of the electronic devices 520, 530, and 540 could be in wireless communication with each other, regardless of whether they are in communication with the WHUD 5100. For instance, the electronic ring 532 could be in wireless communication with the smartphone 522 to control one or more aspects of the smartphone 522.

Generally speaking, wireless communication within the system 510 can be accomplished using any suitable communication protocol. Some communication protocols may be particularly suitable for use within the system 510, since they may be low power consuming protocols that are well suited for short distance wireless communication. Two examples might include ZigBee and Bluetooth®. For instance, one or more of the electronic devices 520, 530, and 540 and WHUD 5100 may include a Bluetooth® Low Energy chip having a signal frequency of about 2400 MHz to about 2500 MHz.

In some implementations, wireless communication within the system 510 can operate using signals having a frequency in a band of 100 MHz, 200 MHz, 300 MHz, 400 MHz, 800 MHz, and 900 MHz.

One of the challenges with facilitating wireless communication within the system 510 relates to the performance of the various components used to send and receive wireless signals, particularly the antenna.

Generally speaking, an antenna is a function of its environment, and its performance can vary greatly depending on whether the antenna is being used is a laboratory environment with minimal interference, or in the real world in the presence of a user. Quite notably, an antenna tends to be affected by everything around it, including materials and surrounding equipment in an electronic device that includes the antenna, but also aspects of the surrounding environment, including the presence of the user. Specifically, the radiated electromagnetic (EM) fields from an antenna interact with nearby materials, which can alter the frequency of operation of the antenna or change its input impedance. This, in turn, can induce a mismatch with the driving power amplifier (e.g., transmitter) or receiving low noise amplifier (e.g., receiver). As a result, to develop reliable antenna performance, the antenna should be tested in its final environment (or a reasonable approximation thereof) and impedance matched so that it operates well within the desired frequency band. A poorly matched antenna on the other hand can degrade the system link budget by 10-30 dB thus severely reducing the overall link range.

For the system 510 described above, it is generally desirable to understand the various use cases around how a user will be interacting with the WHUD 5100 and the other electronic devices 520, 530, and 540. For example, some wearable components such as the electronic ring 532 may be worn by the user of the WHUD 5100 at times, while others such as a smartphone 522 may typically be carried in a pocket. Similarly, the communication distance between a user of the WHUD 5100 and the electronic devices 520, 530, and 540 can vary. In some cases, it may be sufficient to have a working communication range of approximately 10 meters or less to facilitate effective wireless communication between the WHUD 5100 and one or more electronic devices 520, 530, and 540. In some implementations it may be desirable to have a higher working range greater than 10 meters, greater than 20 meters, or even larger. In some cases, it may be suitable to have a smaller working range, such as less than 5 meters, less than 3 meters, and so on. In some cases the effective working communication range can be varied by adjusting the power of the communications modules within the system 510.

Figure 6:
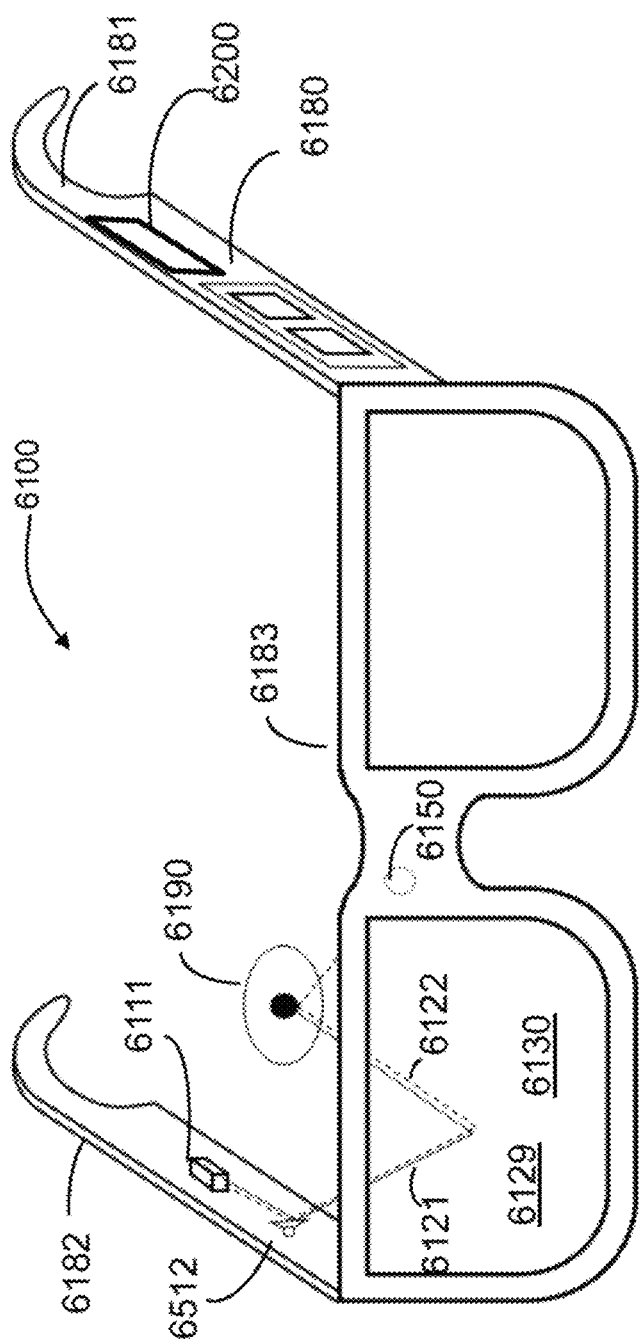
FIG. 6 is a schematic diagram of a wearable heads-up display in accordance with the present systems, devices, and methods.

Turning now to FIG. 6, illustrated therein is a perspective view of an exemplary WHUD 6100 operable for wireless communication with electronic devices, such as electronic devices 520, 530 and 540. WHUD 6100 as shown includes elements such as a projector 6111 (i.e., a laser module) adapted to output a visible laser light 6121 (e.g., in at least a first narrow waveband), and optionally an oscillating mirror or reflector 6512. In some cases, the projector 6111 may be operable to output infrared laser light 6122. The WHUD 6100 also includes a display component that enables the user to see displayed content but also does not prevent the user from being able to see their external environment. As shown, the display component could include a transparent combiner 6130 (aligned with an eyeglass lens 6129) which redirects the laser light 6121 and 6122 towards an eye 6190 of a user. In some implementations, the WHUD 6100 may include at least one infrared photodetector 6150 responsive to infrared laser light 6122.

Depending on the implementation, the visible laser light 6121 may correspond to any of, either alone or in any combination, red laser light, a green laser light, and/or a blue laser light.

WHUD 6100 also includes a support frame 6180 that has a general shape and appearance or a pair of eyeglasses, so that transparent combiner 6130 is positioned within a field of view of an eye 6190 of the user when support frame 6180 is worn on a head of the user. The support frame 6180 typically includes two support arms 6181, 6182 extending rearwardly from a front rim portion 6183 that supports the eyeglass lens 6129 and transparent combiner 630. The rim portion 6183 is normally supported by a nose of the user, while the support arms 6181, 6182 are normally supported by the ears of the user.

WHUD 6100 further includes a digital processor 6160 communicatively coupled to photodetector 6150 (in this example), and a non-transitory processor-readable storage medium or memory 6170 communicatively coupled to digital processor 6160. Memory 6170 stores processor-executable instructions and/or data that, when executed by processor 6160, can cause processor 6160 to take actions, such as determining one or more position(s) and/or movement(s) of eye 6190, determining what information to display on the transparent combiner 6130, and managing communication between the WHUD 6100 and one or more electronic devices 520, 530 and 540.

In particular, WHUD 6100 further includes a communication module 6200 for wireless communication with other electronic devices, and which may be communicatively coupled to the digital processor. Generally speaking, according to the teachings herein, one or more components of the communication module 6200 may be integrated within one or more components of the support frame 6180. For instance, the communication module 6200 may be at least partially integrated within one or both of the support arms 6181, 6182. The communication module 6200 may be at least partially integrated within the rim portion 6183 of the support frame 6180. In some examples, the communication module 6200 may be at least partially integrated within some combination of the support arms 6181, 6182 and the rim portion 6183.

Figure 7B:
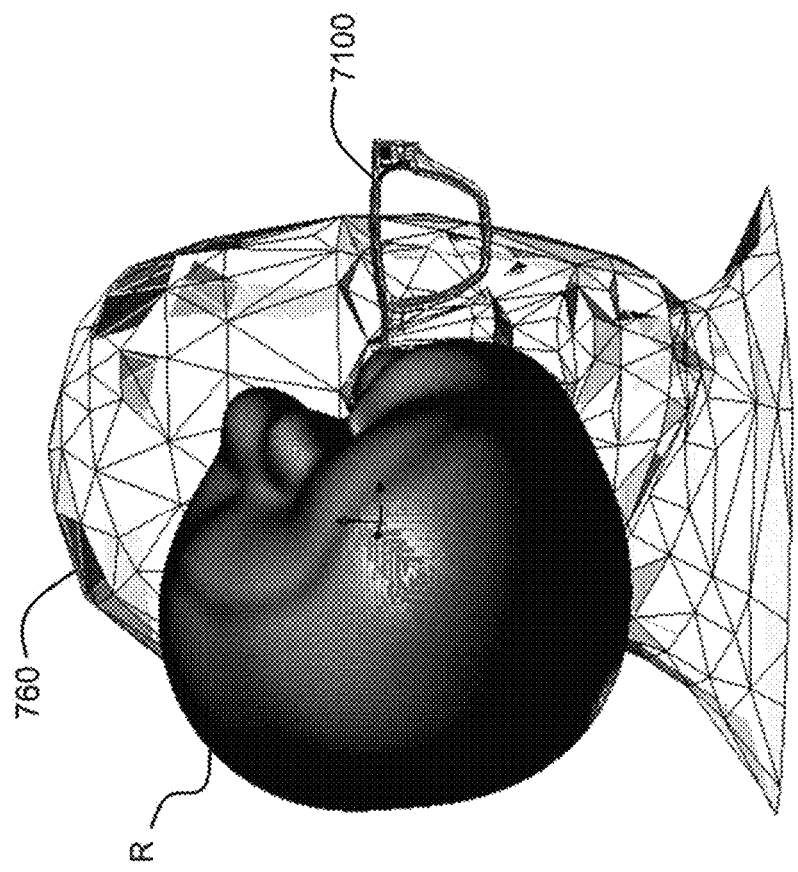
FIG. 7B is a schematic representation of the wearable heads-up display of FIG. 7A showing an exemplary EM pattern generated by an antenna in the wearable heads-up display.
Figure 7A:
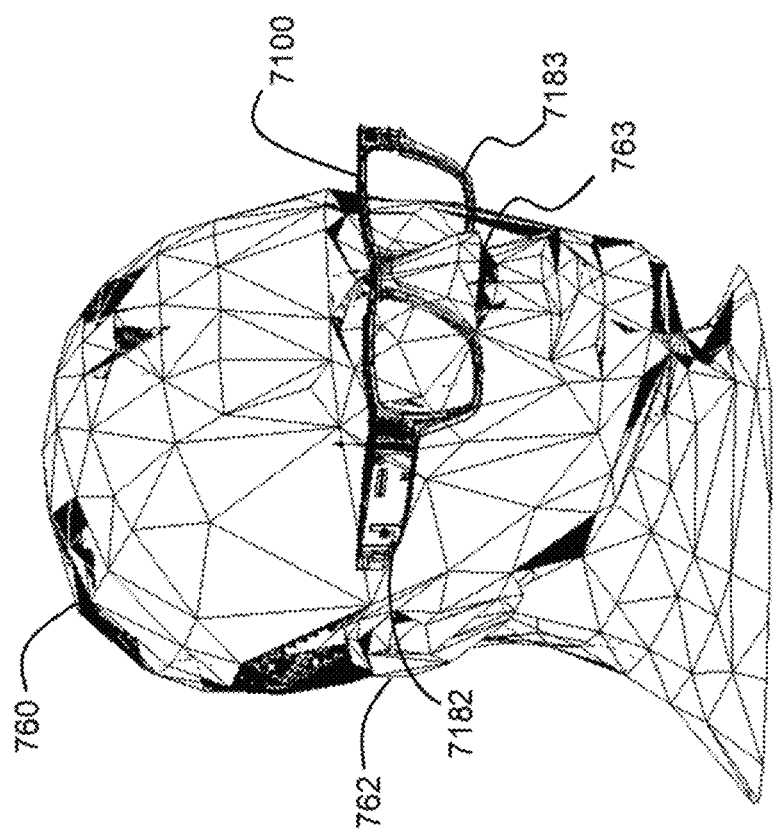
FIG. 7A is a schematic representation of a wearable heads-up display worn on a head of a user.

Generally speaking, the communication module 6200 includes a radio frequency (RF) antenna for the signals transmitted and received via the communication network. For example, FIG. 7A shows the WHUD 7100 mounted on a head 760 of a user, with the support arm 7182 being supported by an ear 762 and the rim portion 7183 being supporting by a nose 763. FIG. 7B on the other hand shows an exemplary EM pattern "R" generated by an antenna in the WHUD 7100.

Figure 8:
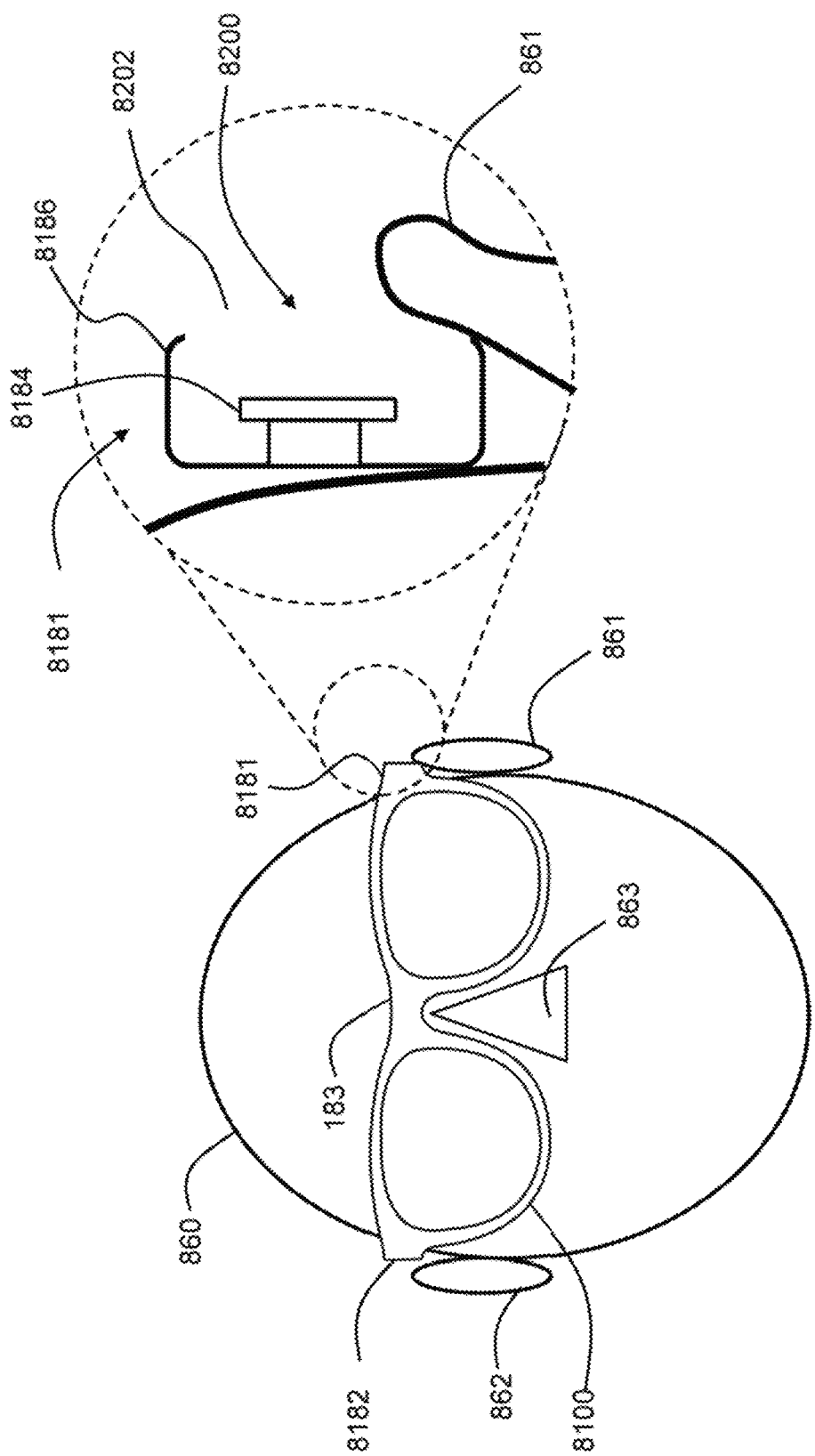
FIG. 8 is a schematic diagram of a communication module integrated within a support arm of a wearable heads-up display according to the present systems, devices, and methods.

Turning now to FIG. 8, the WHUD 8100 mounted on the user's head 860 is shown schematically in greater detail. As shown, the WHUD 8100 is mounted on the head 860, with the arm supports 8181, 8182 being supported by ears 861, 862 (respectively) and the rim portion 8183 being supported by nose 863.

Shown enlarged in is a schematic cross-section of the arm portion 8181 having an integrated communication module 8200 therein. In particular the arm support 8181 generally includes a first body member 8186 that typically extends lengthwise of the arm support 8181, and which serves as a housing for components of the WHUD 8100, such as a printed circuit board (PCB) 8184, which may include the digital processor 8160, memory 8170, and so on. The first body member 8186 may be made of any suitable material, such as a plastic or a metal.

The arm support 8181 also includes a second body member 8202 which is designed to serve as a resonating element or antenna of the communication module 8200. As shown schematically, the second body member 8202 may be electrically and/or mechanically isolated from the first body member 8185. The second body member 8202 may in some implementations comprise a conductive material, such as a metal plate element that resonates in response to instructions received from the digital processor 8160 to send wireless signals to one or more electronic devices 520, 530 and 540. Moreover, the second body member 8202 may also resonate in response to signals received from the electronic devices 520, 530, and 540 to act as a receiving antenna.

Figure 9:
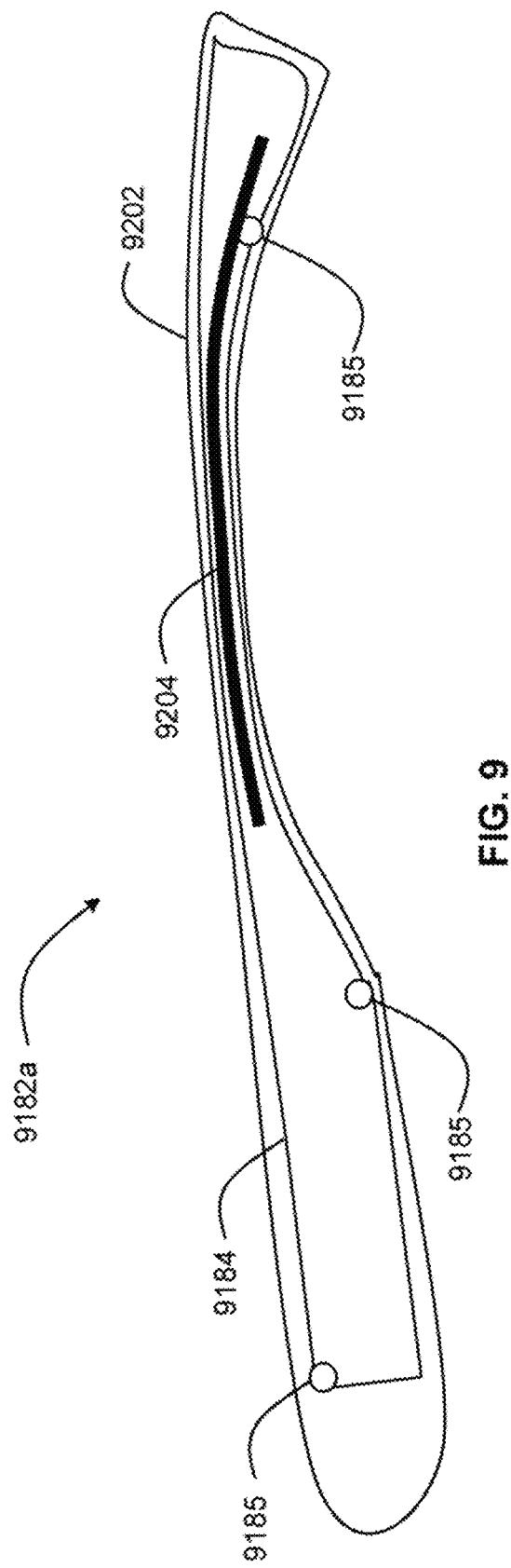
FIG. 9 is a schematic diagram of a communication module having an antenna integrated within a support arm of a wearable heads-up display according to the present systems, devices, and methods.

Turning now to FIG. 9, illustrated therein is an example of an arm support 9182*a* having integrated components of the communication module. In particular arm support 9182*a* includes PCB 9184 which is mounted to the first body member (not shown in FIG. 9), such as via mounting screws 9185. In this implementation, the communication module includes a wire antenna 9204 which is housed within the arm support 9182*a*. In some implementations, the wire antenna 9204 may be coupled to the second body member 9202 to cooperate therewith as an antenna for the WHUD.

Figure 10:
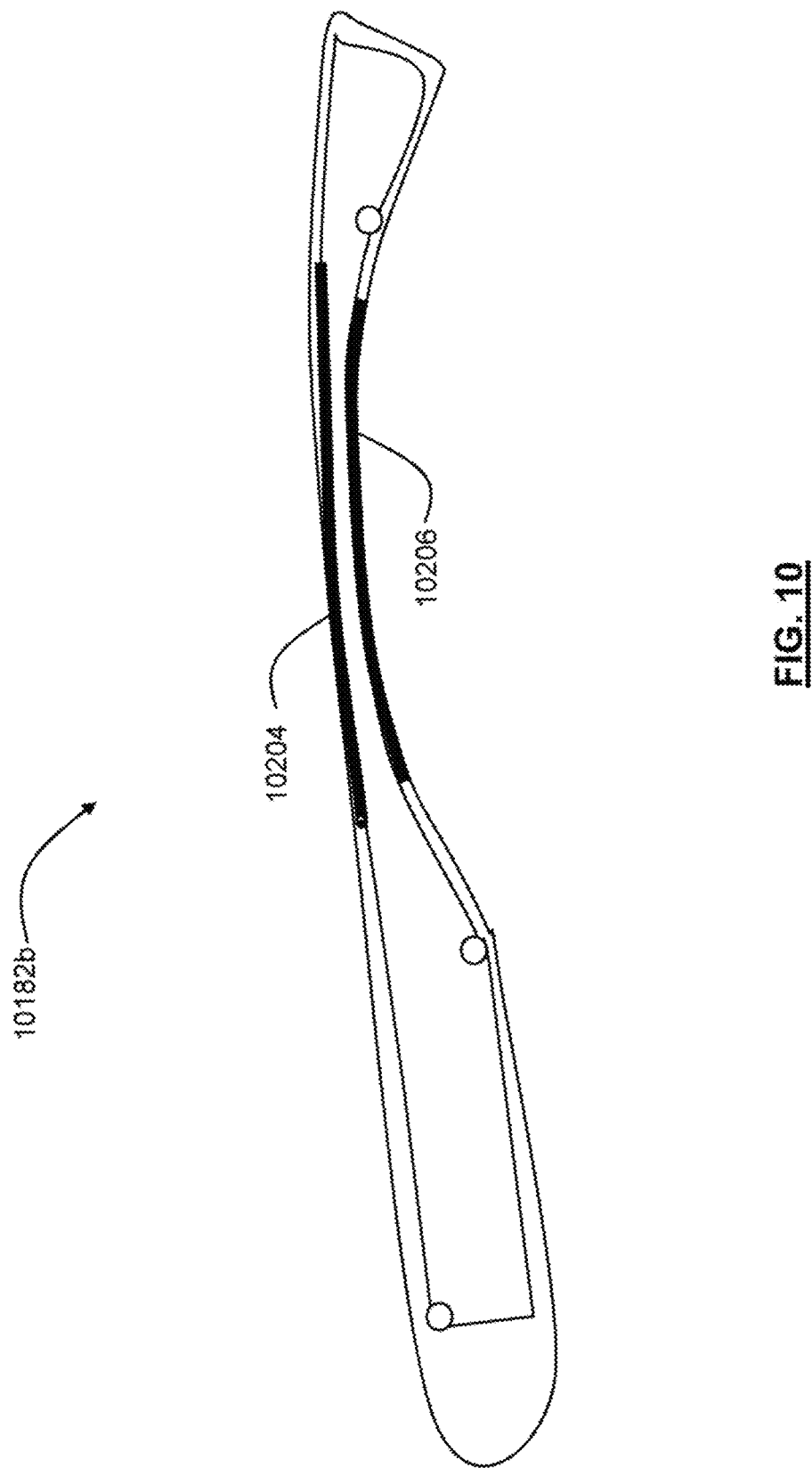
FIG. 10 is a schematic diagram of a communication module having an antenna integrated within a support arm of a wearable heads-up display according to the present systems, devices, and methods.

Turning now to FIG. 10, illustrated therein is an example of another arm support 10182*b* having integrated components of the communication module. In this implementation, the arm support 10182*b* includes the wire antenna 10204 as well as a grounding element 10206 for increasing the ground plane.

Figure 11:
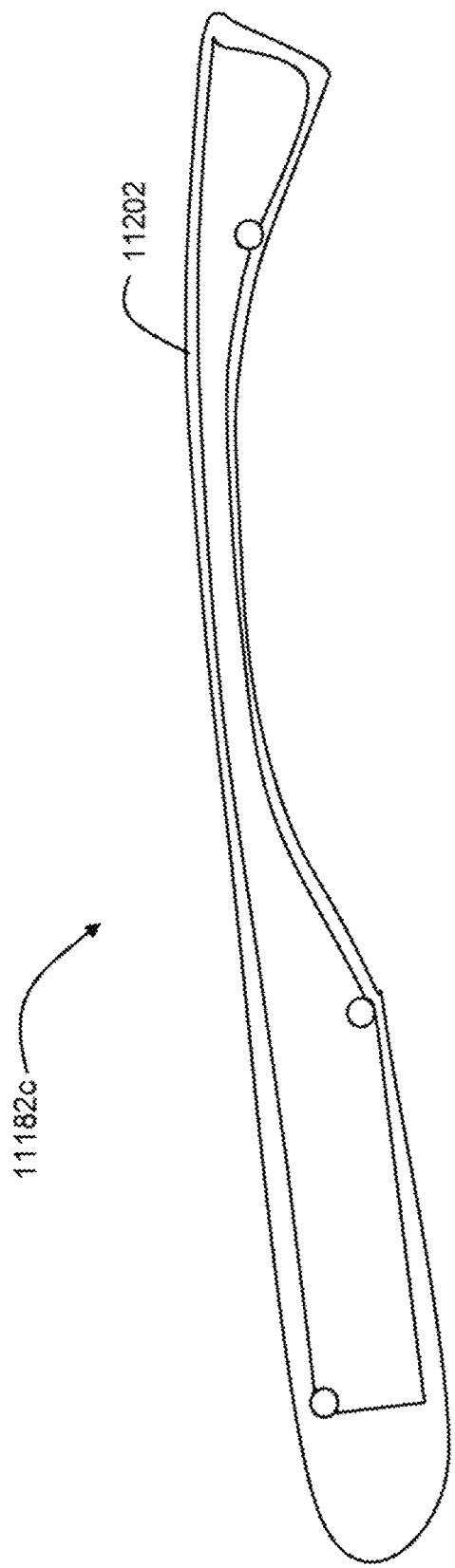
FIG. 11 is a schematic diagram of a communication module having an antenna integrated within a support arm of a wearable heads-up display according to the present systems, devices, and methods.

Turning now to FIG. 11, illustrated therein is an example of another arm support 11182*c* having integrated components of the communication module. In this implementation, the second body portion 11202 serves as the antenna for the communication module without requiring an internal wire antenna.

Since the antenna will be worn but a user, it will be in close proximity to the user's body. By being in close proximity to the user's body, the user's body can affect the input impedance. In some cases, the length of the antenna can be designed to minimize this input impedance. In particular, the length of the antenna can be designed to consider impedance matching. Generally, an ideal length of the antenna is $n\lambda/2$, wherein $\lambda$ is the wavelength of a signal guided.

In addition to selecting an appropriate length for the antenna, matching will also be provided by an impedance matching module on the PCB.

One of the challenges observed, however, with some of the preceding implementations relates to the nature of antennae. In particular, as discussed above an antenna is a function of its environment, and its performance can vary greatly depending on the operating environment. In designing a WHUD, however, it can be difficult to develop a comfortable "one size fits all" arrangement where the size and shape of all the components, particularly the arm supports, is constant. In fact, in contrast, it has been observed that it may be desirable to offer WHUDs in multiple shapes and sizes to accommodate different sizes and shapes of the heads of different users.

Returning to FIG. 8, this means that the respective lengths of the arm portions 8181, 8182 is sometimes different, in some case quite different. As a result, this can have a dramatic impact on the performance of the antenna. Although it may be possible to have a second body portion 8202 that is the same for each of the different sizes of arm portions 8181, 8182, this can lead to aesthetic challenges as differently sized WHUDs 8100 may have a vastly different appearance.

According to another implementation of the teachings herein, one or more of the arm supports 8181, 8182 may incorporate a multi-piece construction, wherein the antenna elements of the communication module 8200 are incorporated in first piece that has a common size and shape, and the other portion of the arm supports 8181, 8182 can vary in length.

Figure 12:
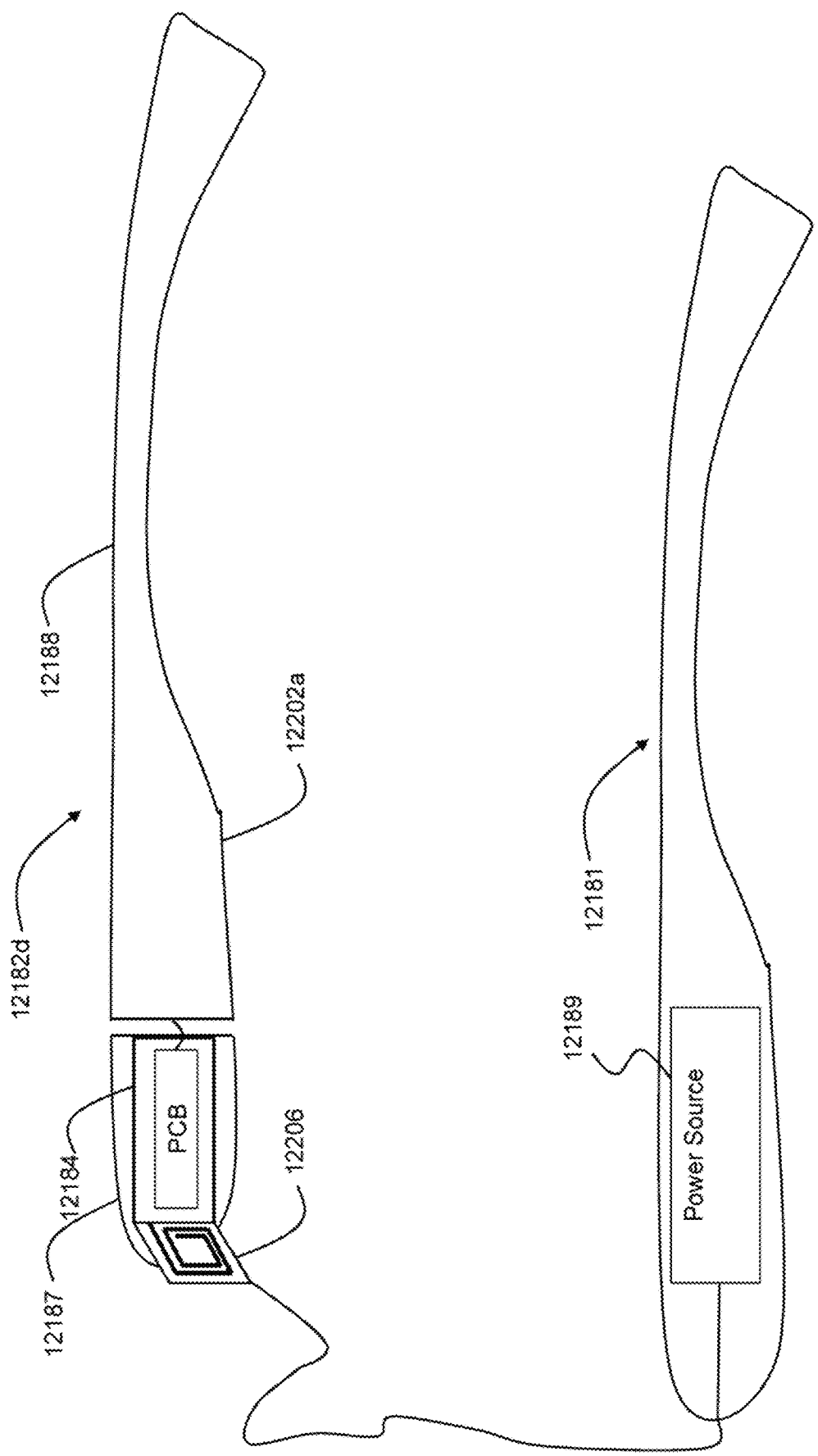
FIG. 12 is a schematic diagram of a communication module having an antenna integrated within a rim portion of a wearable heads-up display according to the present systems, devices, and methods.

One example of such an embodiment is shown schematically in FIG. 12. In this example, the arm support 12182*d* includes a first forward portion 12187, and a second rearward portion 12188. The forward portion 12187 may be positioned adjacent (or even be part of) the rim support, and may include the PCB 12184. As shown, the forward portion 12187 includes an antenna 12206 (shown here as a spiral antenna). The forward portion 12187 can generally have a consistent shape and size, regardless of the sizing required to accommodate a particular head of a user.

The rearward portion 12188 of the arm support 12182*d*, on the other hand, can have a size and shape that is selected to accommodate the sizing requirements for the user's head.

For instance, in larger WHUDs, the rearward portion 12188 could be longer, while in smaller WHUDs the rearward portion 12188 could be smaller.

In some implementations, the rearward portion 12188 could include a body member 12202*a* (i.e., a metal plate), which could be used to extend the ground plane.

As shown in FIG. 12, in this implementation the other arm support 12181 could support a power source 12189 (i.e., a battery) which provides power to the components in the arm support 12182*d*.

Figure 13:
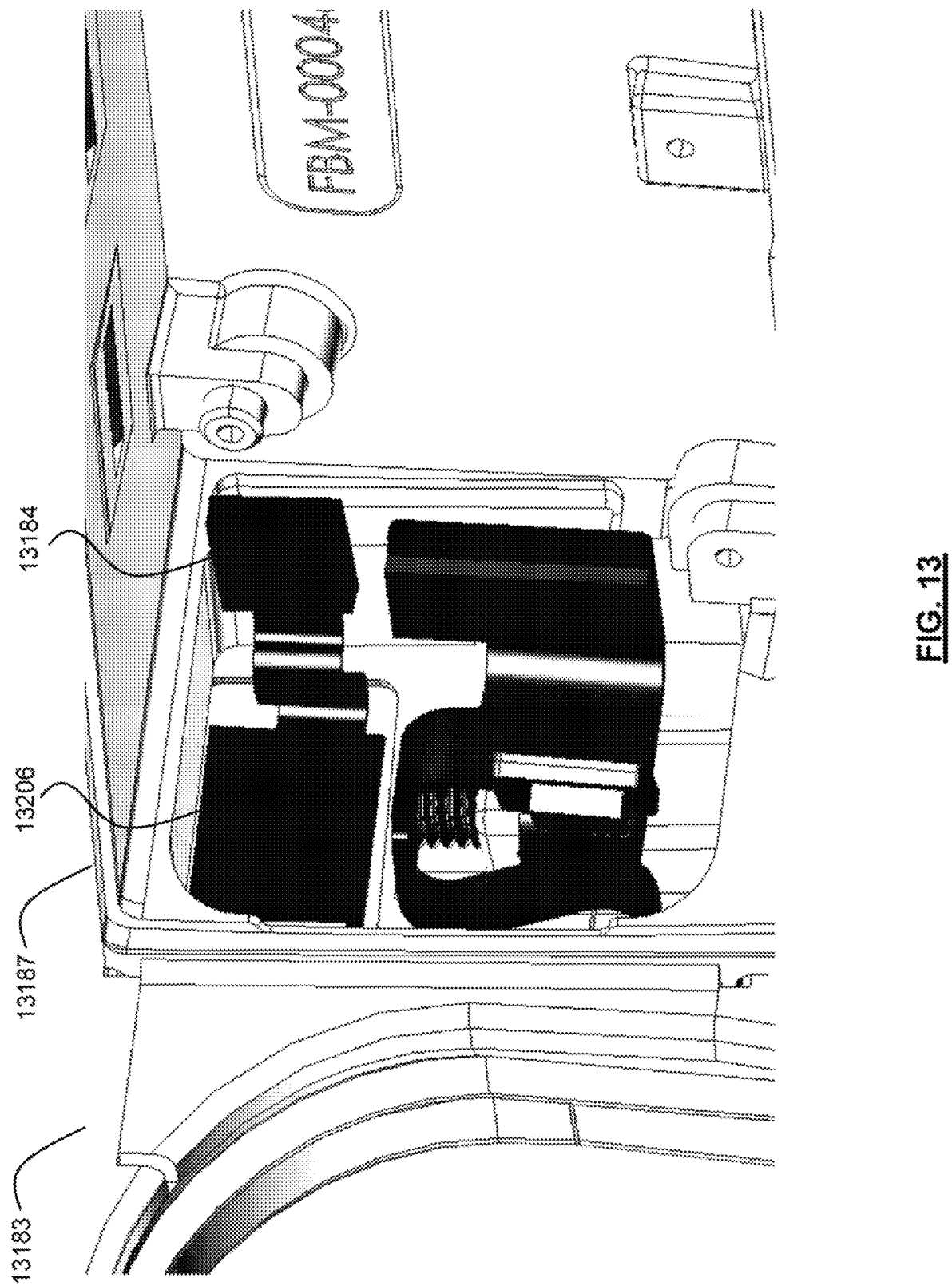
FIG. 13 is a schematic diagram of a communication module having an antenna integrated within a rim portion of a wearable heads-up display according to the present systems, devices, and methods.

Turning now to FIG. 13, illustrated therein is a close up view of an exemplary implementation, wherein the forward portion 13187 may be part of or coupled to the rim support 13183. In this implementation, the antenna 13206 is located in the front area of the forward portion, and is coupled to the PCB 13184 via a flex connector.

Throughout this specification and the appended claims, the term "about" is sometimes used in relation to specific values or quantities. For example, "light within a bandwidth of about 10 nm or less." Unless the specific context requires otherwise, the term about generally means±15%.

The above description of illustrated implementations and embodiments, including what is described in the Abstract, is not intended to be exhaustive or to limit the implementations or embodiments to the precise forms disclosed. Although specific implementations or embodiments of and examples are described herein for illustrative purposes, various equivalent modifications can be made without departing from the spirit and scope of the disclosure, as will be recognized by those skilled in the relevant art. The teachings provided herein of the various implementations or embodiments can be applied to other portable electronic devices, and not necessarily the exemplary eyeglass frames or wearable heads-up displays generally described above.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations or embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

The various implementations or embodiments described above can be combined to provide further implementations or embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to U.S. Provisional Patent Application Ser. No. 62/236,060, U.S. Non-Provisional patent application Ser. No. 15/282,535 (now US Patent Application Publication 2017/0097753), U.S. Non-Provisional patent application Ser. No. 15/799,642 (now US Patent Application Publication 2018/0067621), U.S. Provisional Patent Application Ser. No. 62/609,607, and U.S. Provisional Patent Application Ser. No. 62/634,654 are incorporated herein by reference, in their entirety. Aspects of the implementations or embodiments can be modified, if necessary, to employ systems, circuits and concepts of the various patents, applications and publications to provide yet further embodiments.

These and other changes can be made to the implementations or embodiments in light of the above-detailed description. In general, in the following claims, the terms used should not be construed to limit the claims to the specific embodiments disclosed in the specification and the claims, but should be construed to include all possible implementations or embodiments along with the full scope of equivalents to which such claims are entitled. Accordingly, the claims are not limited by the disclosure.

The invention claimed is:

1. An apparatus, comprising:
   a front eyeglass frame, including: a first rim, a second rim, and a bridge connecting the first rim with the second rim;
   a first arm coupled to the first rim;
   a radio housed by the first arm;
   a second arm coupled to the second rim;
   circuitry communicatively coupleable to a power source, the circuitry housed by the second arm;

a first electrically conductive path that electrically couples the radio to the circuitry, the first electrically conductive path extending along a portion of the second rim, the bridge, and a portion of the first rim; and an antenna communicatively coupled to the radio, the antenna extending along at least a portion of the first rim.

2. The apparatus of claim 1 wherein the first rim includes a first upper peripheral portion and a first lower peripheral portion, and wherein the second rim includes a second upper peripheral portion and a second lower peripheral portion.

3. The apparatus of claim 2 wherein the antenna passes internally from the radio along the first upper peripheral portion of the first rim to at least the bridge.

4. The apparatus of claim 3 wherein the first electrically conductive path passes internally along the second upper peripheral portion of the second rim, the bridge, and the first lower peripheral portion of the first rim.

5. The apparatus of claim 3 wherein the first electrically conductive path passes internally along the second lower peripheral portion of the second rim, the bridge, and the first lower peripheral portion of the first rim.

6. The apparatus of claim 2 wherein the antenna passes internally from the radio along the first lower peripheral portion of the first rim to at least proximate the bridge.

7. The apparatus of claim 6 wherein the first electrically conductive path passes internally along the second upper peripheral portion of the second rim, the bridge, and the first upper peripheral portion of the first rim.

8. The apparatus of claim 6 wherein the first electrically conductive path passes internally along the second lower peripheral portion of the second rim, the bridge, and the first upper peripheral portion of the first rim.

9. The apparatus of claim 2 wherein the first electrically conductive path passes internally along the second upper peripheral portion of the second rim, the bridge, and the first upper peripheral portion of the first rim.

10. The apparatus of claim 1 wherein the antenna comprises a coaxial cable having a shielded portion and an exposed portion.

11. The apparatus of claim 10 wherein the shielded portion of the antenna extends in the first arm and the unshielded portion of the antenna extends in the first rim.

12. The apparatus of claim 11 wherein the unshielded portion of the antenna has a length equal to a quarter wavelength of a signal to be transmitted or received by the antenna.

13. The apparatus of claim 1, further comprising:
display components carried by at least the first arm.

14. The apparatus of claim 1, further comprising:
a first lens mounted in the first rim; and
a second lens mounted in the second rim.

15. The apparatus of claim 14 wherein the first electrically conductive path extends through the first rim overtop of the first lens and the antenna extends through the first rim underneath the first lens.

16. The apparatus of claim 14 wherein the first electrically conductive path extends through the first rim underneath the first lens and the antenna extends through the first rim overtop of the first lens.

* * * * *